United States Patent
Sandbach et al.

(10) Patent No.: US 7,102,614 B2
(45) Date of Patent: *Sep. 5, 2006

(54) MANUAL INPUT APPARATUS FOR A HANDHELD DEVICE

(75) Inventors: David Lee Sandbach, London (GB); Stuart Mark Walkington, St. Albans (GB); Christopher Chapman, Watlington (GB)

(73) Assignee: Eleksen Limited, Hertfordshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 629 days.

(21) Appl. No.: 09/980,236

(22) PCT Filed: May 30, 2001

(86) PCT No.: PCT/GB01/01444

§ 371 (c)(1),
(2), (4) Date: Nov. 29, 2001

(87) PCT Pub. No.: WO01/75572

PCT Pub. Date: Oct. 11, 2001

(65) Prior Publication Data

US 2003/0146902 A1    Aug. 7, 2003

(30) Foreign Application Priority Data

| Mar. 30, 2000 | (GB) | ................................ 0007679 |
| May 18, 2000 | (GB) | ................................ 0011962 |
| Nov. 2, 2000 | (GB) | ................................ 0026806 |
| Nov. 2, 2000 | (GB) | ................................ 0026807 |

(51) Int. Cl.
*G09G 5/00* (2006.01)

(52) U.S. Cl. .................................... 345/156; 345/169
(58) Field of Classification Search ............. 345/156, 345/168, 169, 179, 182; 341/20, 22; 364/709.11, 364/709.08, 709.01, 708; 400/472, 715
See application file for complete search history.

(56) References Cited

U.S. PATENT DOCUMENTS

| 3,911,215 A | 10/1975 | Hurst et al. |
| 4,220,815 A | 9/1980 | Gibson et al. |
| 4,687,885 A | 8/1987 | Talmage, Jr. et al. |
| 4,707,845 A | 11/1987 | Krein et al. |
| 4,798,919 A | 1/1989 | Miessler et al. |
| 5,100,098 A | 3/1992 | Hawkins |

(Continued)

FOREIGN PATENT DOCUMENTS

DE    29512808    3/1996

(Continued)

OTHER PUBLICATIONS

International Search Report - PCT/GB01/01444; EPO - Nov. 1, 2001.

*Primary Examiner*—Bipin Shalwala
*Assistant Examiner*—Nitin Patel
(74) *Attorney, Agent, or Firm*—Harness, Dickey & Pierce, P.L.C.

(57) ABSTRACT

The present invention relates to a manually operable input apparatus (202) for a portable electronic processing device (102), such as a mobile phone or hand-held processor. The apparatus defines a plurality of regions (303, 304) each representing a respective data item and comprises a plurality of sheets configured to produce a response to a mechanical interaction. Furthermore, the sheets are configured to be wrapped around the device to provide a protective cover.

21 Claims, 34 Drawing Sheets

U.S. PATENT DOCUMENTS

| | | | |
|---|---|---|---|
| 5,159,159 A | 10/1992 | Asher | |
| 5,220,521 A * | 6/1993 | Kikinis | 708/138 |
| 5,262,778 A | 11/1993 | Saunders | |
| 5,453,941 A | 9/1995 | Yoshikawa | |
| 5,459,461 A * | 10/1995 | Crowley et al. | 341/22 |
| 5,616,897 A * | 4/1997 | Weber et al. | 200/5 A |
| 5,648,771 A * | 7/1997 | Halgren et al. | 341/22 |
| 5,686,705 A | 11/1997 | Conroy et al. | |
| 5,815,139 A | 9/1998 | Yoshikawa et al. | |
| 5,852,260 A | 12/1998 | Yoshikawa | |
| 6,108,200 A * | 8/2000 | Fullerton | 361/686 |
| 6,174,097 B1 * | 1/2001 | Daniel | 400/472 |
| 6,178,619 B1 * | 1/2001 | Tai | 29/622 |
| 6,265,993 B1 * | 7/2001 | Johnson | 341/22 |
| 6,538,642 B1 * | 3/2003 | Tsai | 345/168 |
| 6,575,647 B1 * | 6/2003 | Daniel | 400/472 |
| 6,585,162 B1 * | 7/2003 | Sandbach et al. | 235/462.44 |
| 2002/0063690 A1 * | 5/2002 | Chung et al. | 345/168 |
| 2002/0122028 A1 * | 9/2002 | Wang | 345/168 |
| 2002/0180621 A1 * | 12/2002 | Chan | 341/22 |
| 2004/0169642 A1 * | 9/2004 | Olodort et al. | 345/168 |

FOREIGN PATENT DOCUMENTS

| | | |
|---|---|---|
| DE | 29512808 | 5/1996 |
| EP | 0092731 | 11/1983 |
| EP | 0261770 | 7/1987 |
| GB | 2279617 | 1/1995 |
| GB | 2341933 | 3/2000 |
| GB | 2350431 | 11/2000 |
| GB | 2350683 | 12/2000 |
| JP | 05031963 | 2/1993 |
| JP | 05031963 A | 2/1993 |
| WO | 00/10878 | 3/2000 |
| WO | WO 00/10878 | 3/2000 |
| WO | 00/54479 | 9/2000 |
| WO | WO 01/44910 | 6/2001 |

* cited by examiner $$R_v \propto \frac{1}{V_1} + \frac{1}{V_2}$$

$$\frac{1}{R_v} \sim \propto AREA.FORCE$$

MANUAL INPUT APPARATUS FOR A HANDHELD DEVICE

CROSS-REFERENCE TO RELATED APPLICATIONS

This application is a National Stage of International Application No. PCT/GB01/01444, filed Mar. 30, 2001. This application claims the benefit of GB 0007679.4 filed Mar. 30, 2000, GB 0011962.8 filed May 18, 2000, GB 0026806.0 filed Nov. 2, 2000 and GB 0026807.8 filed Nov. 2, 2000. The disclosures of the above applications are incorporated herein by reference.

FIELD OF THE INVENTION

The present invention relates to a manually operable input apparatus in combination with a hand-held processor, and more particularly where the manually operable input apparatus is wrapped around the hand-held processor to form a protective cover.

DESCRIPTION OF RELATED ART

Manually operable input apparatus for portable electronic processing devices are known. For example, it is possible to connect a portable keyboard to hand-held computing devices such as those sold under the trademark "PALM®".

Known keyboards of this type are essentially rigid in construction and made portable by the provision of hinges. However, arrangements of this type add significantly more additional bulk to the overall device and, therefore, would tend not to be carried around with the device at all times.

Palm devices and other similar portable electronic processing devices often include some sort of keyboard, such as an on screen keyboard, but these tend to be relatively small, as in the palm devices, or of a restricted nature. Thus, for example, it is possible to enter alpha-numeric data using a telephone type keyboard on mobile cellular telephones for example using only the numeric keypad. Generally, this is relatively time consuming in that several presses of a key are often required in order to emulate a provision of a full size keyboard. Sophisticated algorithms are known to facilitate the operation of devices of this type but generally they are far from ideal and make the entry of text messages relatively cumbersome compared to the facilities available when provided with a larger size keyboard.

BRIEF SUMMARY OF THE INVENTION

The Applicants' invention provides a manually operable input, apparatus for a portable electronic processing device, defining a plurality of regions each representing a respective data item, said manually operable input apparatus comprising a plurality of sheets configured to produce a response to a mechanical interation,
  wherein said sheets are configured to be wrapped, around said device to provide a protective cover.

In an embodiment of the invention, the manually operable input apparatus of the present invention is an alpha numeric keyboard. In a preferred embodiment, the keyboard comprises one or more sheets of fabric. In a further preferred embodiment, the keyboard is a membrane keyboard.

The portable electronic processing device is preferably a hand-held device such as a mobile phone or a hand-held processor such as those sold under the trademark PALM®.

By hand-held we mean that an operator of the device may conveniently hold the device in their hand during normal operation of the device.

BRIEF DESCRIPTION OF THE DRAWINGS

The invention will now be described by way of example only, with reference to the accompanying drawings in which.

DETAILED DESCRIPTION OF THE INVENTION AND THE PREFERRED EMBODIMENTS

FIG. 1

Figure 1:
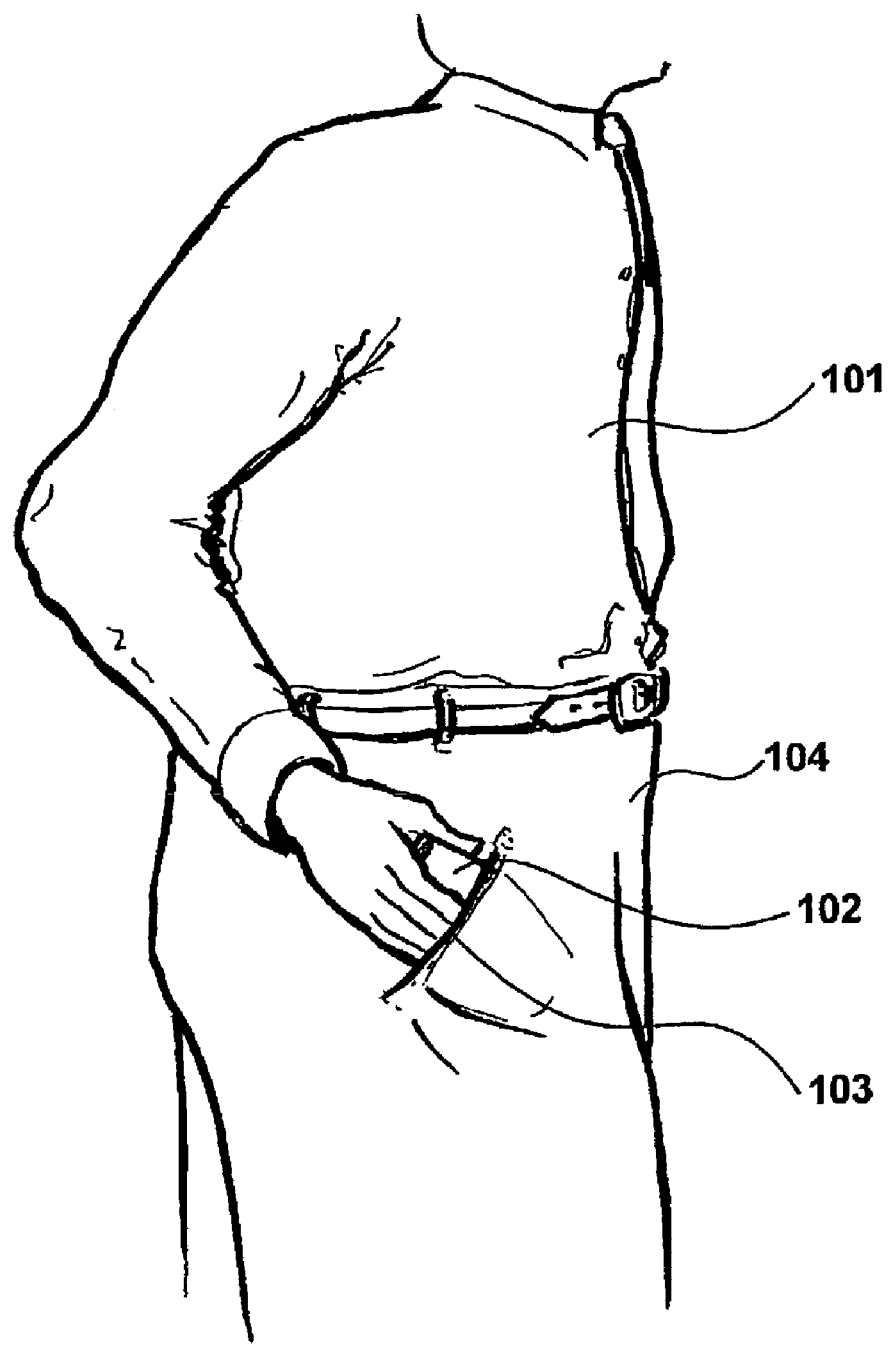
FIG. 1 shows a person transporting a device according to the present invention.

FIG. 1 shows an operator 101 removing a device 102 according to the present invention from a pocket 103 in trousers 104. The device 102 is of suitable size and shape so as to enable convenient transportation of the device either in a pocket of a pair of trousers as shown in FIG. 1 or, alternatively, in another environment such as a briefcase or a bag. The device 102 comprises an electronic processor device in the form of a hand-held processor (not shown) encapsulated within a protective covering which forms the external surface of the device 102. In this embodiment, the protective covering is formed by a manually operable input apparatus wrapped around the hand-held processor and configured to be used in combination with the hand-held processor to input data. The protective cover formed by the manually operable input apparatus is a flexible and durable fabric configured to protect the structural integrity of the encapsulated hand-held processor.

FIG. 2

Figure 2:
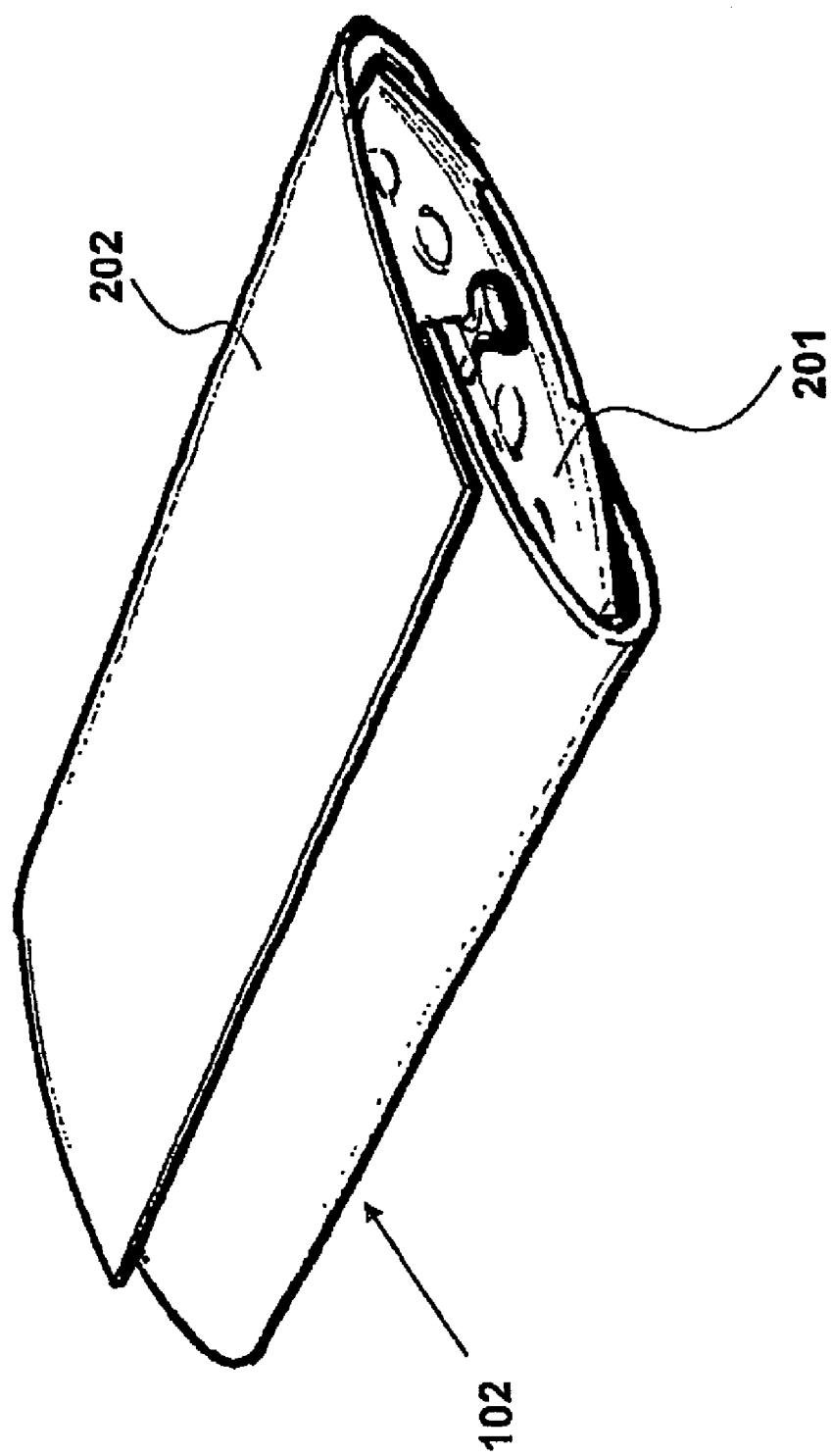
FIG. 2 shows a first embodiment of the present invention in a wrapped configuration.

A perspective view of a first embodiment of the device 102 of the present invention in the wrapped configuration is shown in FIG. 2. The hand-held electronic processor 201 is completely encapsulated by the manually operable input apparatus which, in the present embodiment, is in the form of a fabric keyboard 202. The hand-held processor 201 is a Palm® Vx Processor manufactured by 3Com.

In the wrapped configuration shown in FIG. 2, the fabric keyboard 202 forms a protective covering configured to prevent the scratching of the surface of the hand-held processor 202 and, in addition, to provide cushioning to prevent impacts adversely affecting the structural integrity of the processor. The fabric keyboard is secured in the wrapped configuration by a hook and loop fastening system such as is sold under the trademark VELCRO® (not shown) which will be described further in reference to FIG. 3.

FIG. 3

Figure 3:
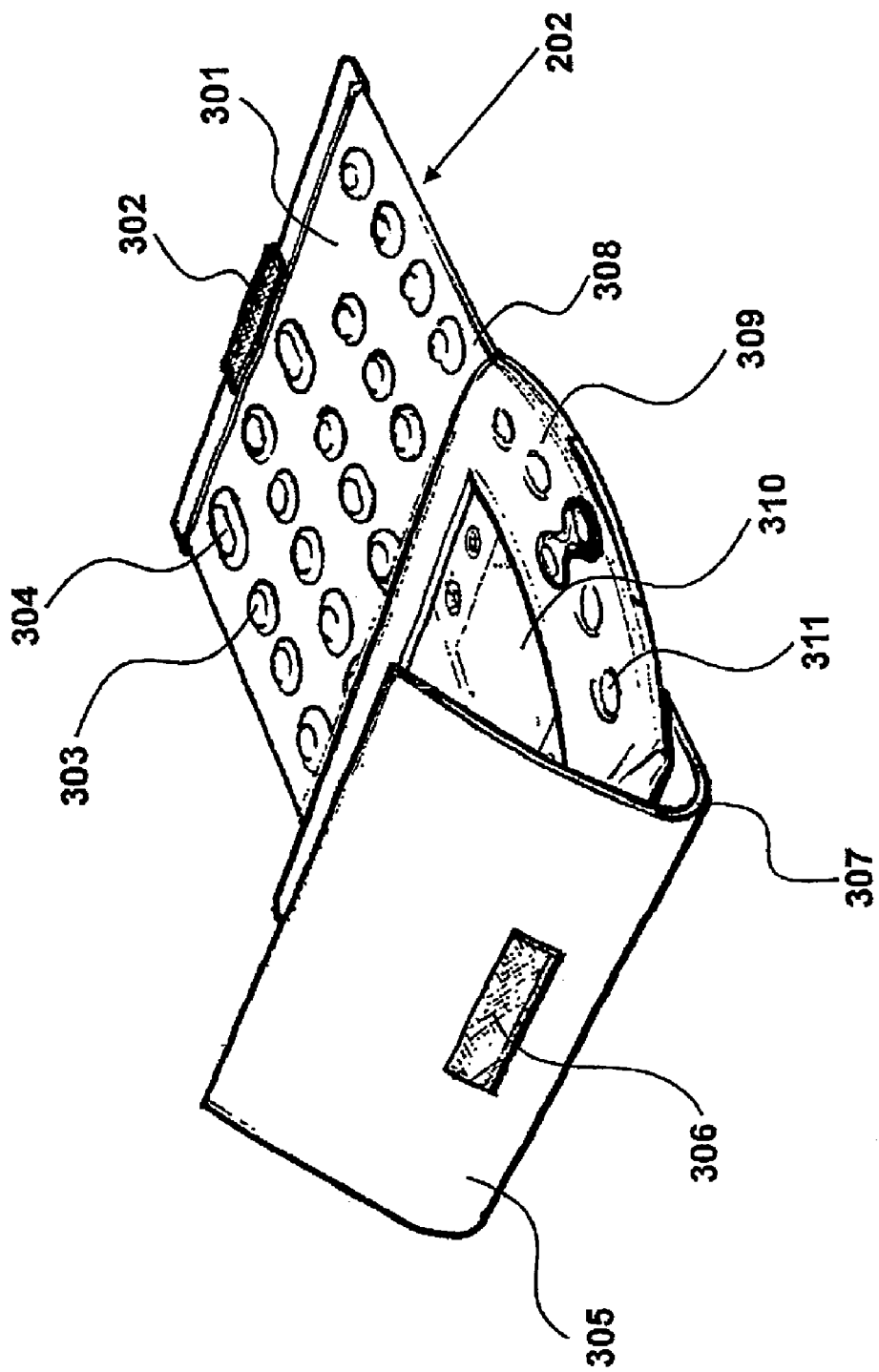
FIG. 3 shows the apparatus of FIG. 2 in a part-unfolded configuration.

The device 102 Illustrated in FIG. 2 is shown in a part-unfolded configuration in FIG. 3. The fabric keyboard 202 is shown in FIG. 3 having a first accessible lateral portion 301 in a completely unfolded position. The internal surface of the first lateral portion 301 of fabric keyboard 202 has a hook strip 302 on its internal surface which forms part of the securing hook and loop fastening system. Also located on the internal surface of the fabric keyboard 202 are key registration device protrusions such as 303 and 304. The key registration device protrusions have a corresponding graphical icon printed thereon to identify the function and/or the alpha numerical input to which the key registration device corresponds.

A second lateral portion 305 is shown in FIG. 3 in a partially bent over position. On the external surface of the second lateral portion 305 is a loop strip 306 which is configured to be releasably engaged with the hook strip 302 on the internal surface of the first lateral portion 301 to secure the first and second lateral portions together in the wrapped configuration as shown in FIG. 2.

In addition to the first and second lateral portions of the fabric keyboard 202, there is a central portion (not visible in FIG. 3) on to which the hand-held processor 309 is located. The first and second lateral portions 301 and 305, and the central portion are defined by two bend portions indicated at 307 and 308. During the bending operations performed on the fabric keyboard 202 to form the wrapped configuration shown in FIG. 2, the bend portion 307 bends around a side edge of the hand-held processor 309 along a first axis and the bend portion 308 bends along the opposing side edge of the hand-held processor 309 along a second axis. The relationship between the first and second axis is dictated by the precise shape of the hand-held processor 309 about which the fabric keyboard 202 is to be wrapped. In the embodiment shown in FIG. 3, the hand-held processor 309 has two parallel side edges and, correspondingly, the first and second axis about which portions 307 and 308 bend respectively are disposed in a parallel relationship to one another.

FIG. 4

Figure 4:
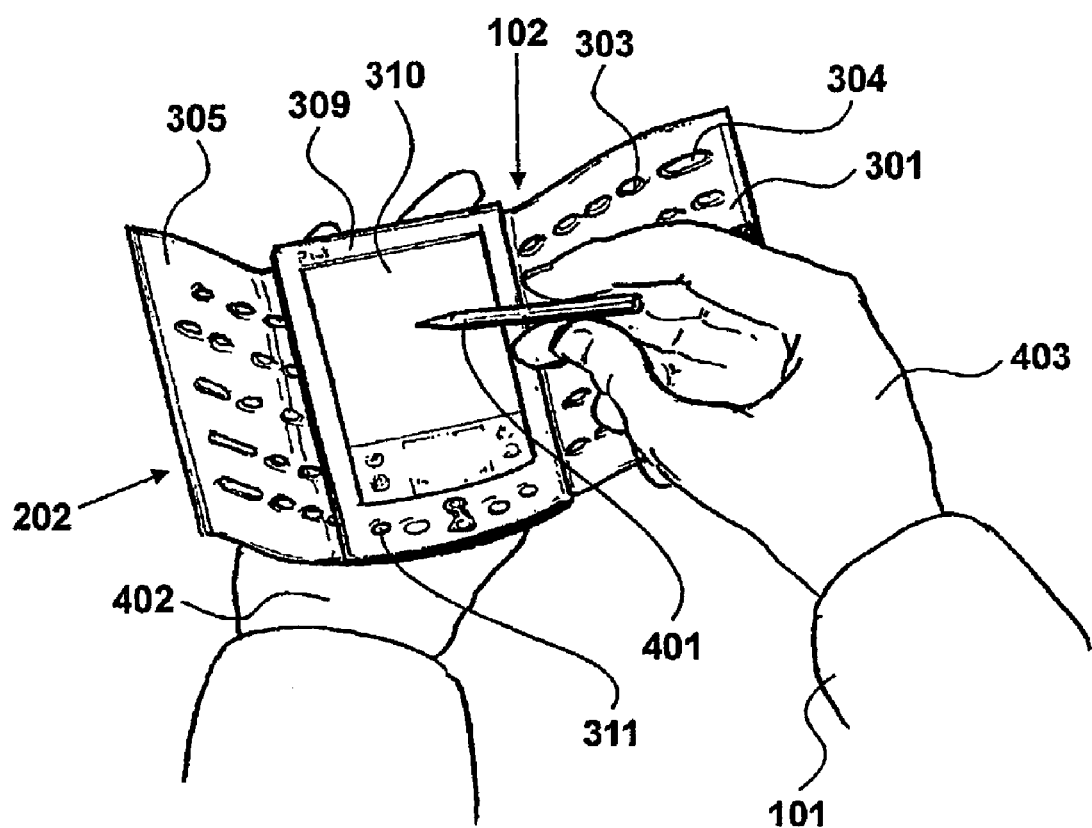
FIG. 4 shows the apparatus shown in FIG. 2 in the intermediate configuration.

FIG. 4 shows the device 102 being used in an intermediate configuration. The device 102 is supported by an operator's hand 402 and the first lateral portion 301 and the second lateral portion 305 of the keyboard 202 are shown substantially in the non-bent position with the hand-held processor 309 located centrally on a central portion of the keyboard between the two lateral portions of the keyboard 202. Key registration devices such as, for example 303 and 304, are visible on the internal surfaces of the first and second lateral portions 301 and 302.

In the intermediate configuration shown in FIG. 4, the hand-held processor 309 is arranged such that the screen 310 and buttons such as 311 are revealed to the operator 101. The operator 101 can select specific data items by interacting with the screen 310 using the stylus 401 or by pressing the button, such as 311. Accordingly, the operator 101 can interact with the hand-held processor 309 using the second free hand 403 which is shown in FIG. 4 selecting an icon on the screen of the hand-held processor using the stylus 401. Hence, in the intermediate configuration, the hand-held processor 309 may be operated without using the keyboard 202. Therefore, if the operator only wishes to use the hand-held processor device 309 alone, it is only necessary to reconfigure the device 102 from the wrapped configuration to the intermediate configuration as shown in FIG. 4. Furthermore, when the operator 101 has completed the necessary operations on the hand-held processor device 309, the device may be conveniently reconfigured to the wrapped configuration for transportation by bending the second lateral portion 305 over the exposed face of the hand-held processor device 309 and subsequently bending the first lateral portion 301 over the remainder of the exposed face of the hand-held processor 309 and securing the first lateral portion to the second lateral portion.

If the operator 101 should wish to use the keyboard 202 in conjunction with the hand-held processor 309 then it is necessary to reconfigure the apparatus from the intermediate position to the operational position. The process by which this is achieved will be described in reference to FIGS. 5, 6 and 7.

FIG. 5

Figure 5:
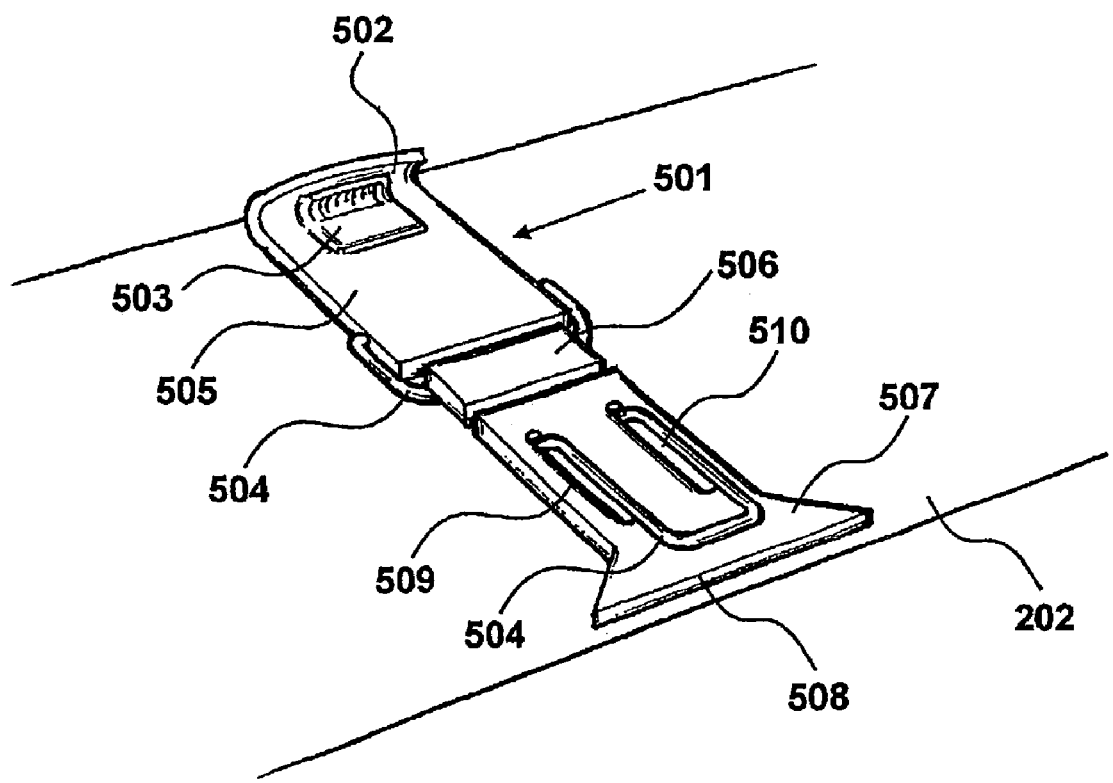
FIG. 5 is a further rear view of the device shown in FIG. 4 detailing the self-erecting stand assembly.

FIG. 5 shows a rear view of a self-erecting stand assembly 501 located on the surface of the keyboard 202 in the intermediate position. The self-erecting stand assembly 501 is not visible in FIG. 4 as it lies directly adjacent to the surface of the keyboard 202 and is concealed behind the hand-held processor 309. Consequently, and for the purpose of illustration only, the hand-held processor has been omitted from FIG. 5 to enable the self-erecting stand assembly 501 to be clearly visible. In the intermediate configuration, the self-erecting stand assembly 501 lies directly adjacent to the keyboard surface in contact with the key registration devices of the central portion (not shown).

The self-erecting stand assembly 501 comprises a hand-held processor engaging portion 502 which is configured to engage the hand-held processor 309 into position on the assembly 501. An interface circuit 503 is located adjacent to the hand-held processor engaging portion 502 and is configured to engage with the corresponding input connections of the hand-held processor 309 such that a connection between the interface circuit and the hand-held processor 309 is formed when the hand-held processor is located on the self-erecting stand assembly 501. The interface circuit 503 is connected to the keyboard 202 by a flexible fabric cable having electrical connection elements contained therein, and which runs along the length of the support stand assembly 501 and forms a connection with the keyboard at the base 508 of the assembly 501.

The main body of the self-erecting support stand assembly comprises three plastic support portions. The first plastic support portion 505 is integrally formed with the hand-held processor engaging portion 502. Spaced apart from the first plastic support portion 505 is a second plastic support portion 506 which is spaced apart from a further third plastic support portion 507. The third plastic support portion 507 is connected to the keyboard at base 508. A support leg 504 is hingeably attached to the first portion 505 and extends through slots 509 and 510 of the third plastic support portion 507. In the intermediate configuration as shown in FIG. 5 the plastic support portions and the support leg 504 are arranged in a flat configuration over the surface of the keyboard 202 to provide the minimum amount of bulk to the device 102 in the intermediate and wrapped configurations.

FIG. 6

Figure 6:
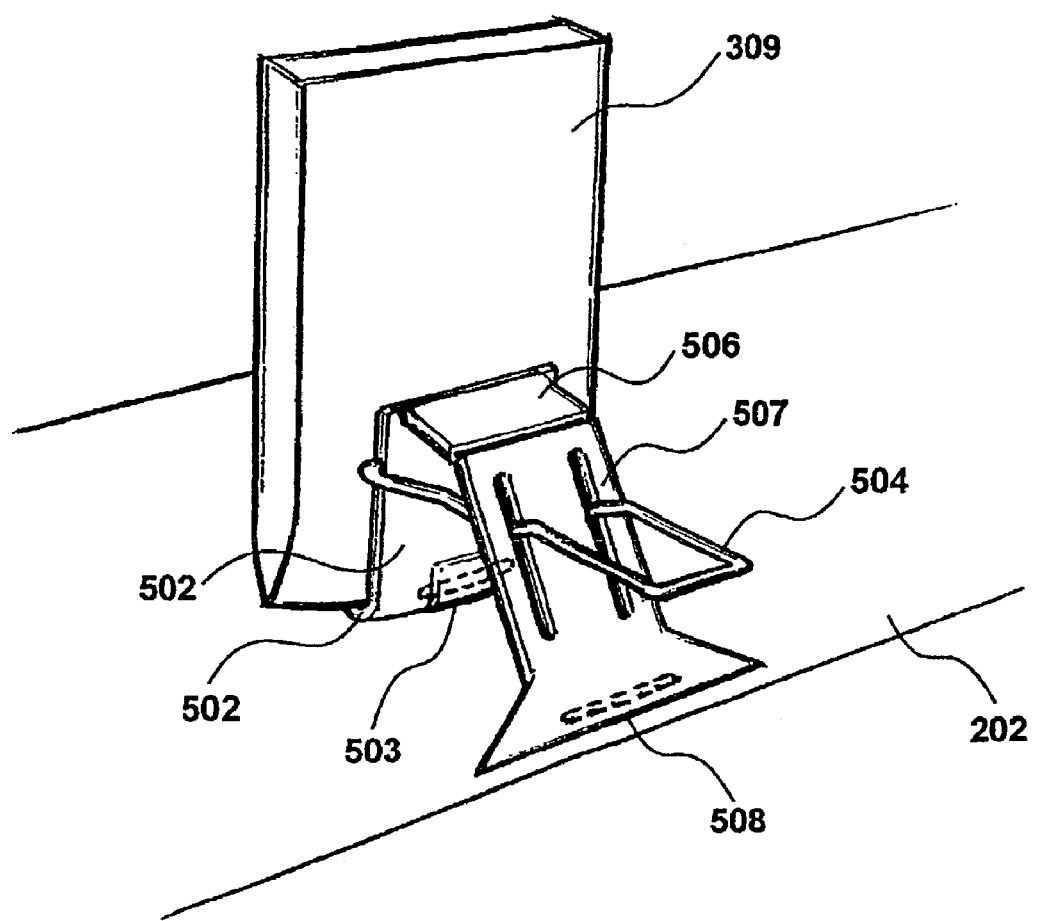
FIG. 6 is a further rear view of the self-erecting stand assembly shown in FIG. 5 in a transitional position.

A further view of a transitional configuration in which the self-erecting stand assembly 501 is sliding from the intermediate configuration to the operational configuration is shown in FIG. 6. The back surface of the hand-held processor 309 is shown supported on the self-erecting stand assembly 501 by the first plastic support portion 505 and the hand-held processor engaging portion 502. As previously mentioned, the interface circuit 503 is electrically connected to the hand-held processor 309 when the processor is located onto the self-erecting stand assembly 501. The self-erecting stand assembly 501 is flexing on either side of the second plastic support portion 506 and between the third plastic support portion 507 and the keyboard 202. The flexing at these positions is facilitated by bending of the flexible fabric cable which runs from the base 508 to the interface circuit 503 and connects the first, second and third plastic support portions together. In an alternative embodiment, the connection between the base 508 and the keyboard and the first, second and third plastic support portions are hinged so as to facilitate the appropriate bending between the sections.

In the transitional configuration, the port leg 504 is extended outwards through slots in the third plastic support portion 507.

FIG. 7

Figure 7:
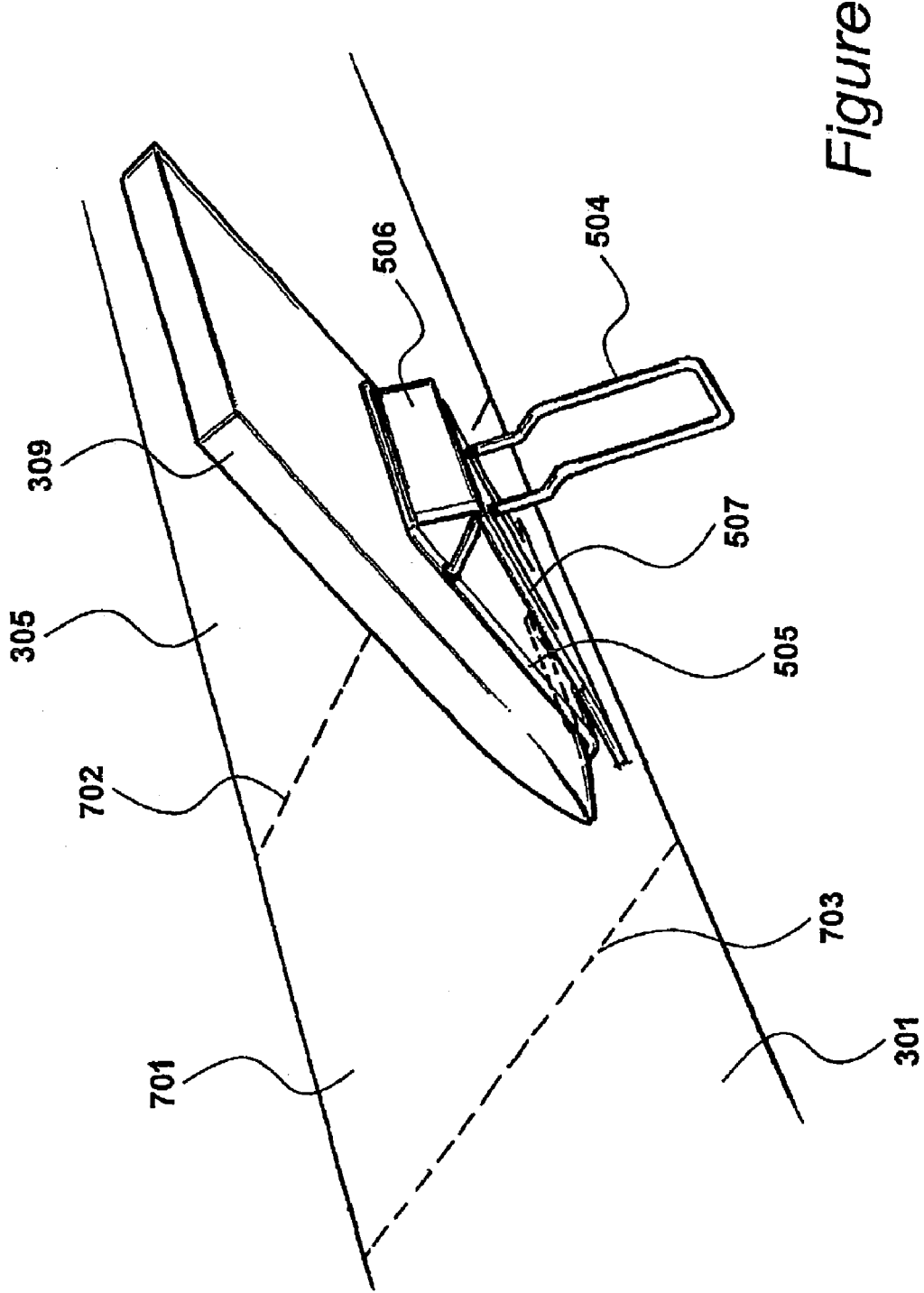
FIG. 7 is a further rear view of the device shown in FIG. 5 detailing the self-erecting stand assembly in the operational configuration.

FIG. 7 shows the self-erecting stand assembly 501 in the operational configuration. The continued slide of the self-erecting stand assembly from the transitional configuration shown in FIG. 6 results in the first plastic support portion 505 travelling further towards the third plastic support portion 507 whilst the support leg 504 extends further outwards to engage with the surface onto which the device 102 is placed.

In the operational configuration, the hand-held processor device 309 is supported in an elevated position spaced apart from the keyboard 202. Accordingly, the central portion of keyboard 202 is revealed so as to enable access to the entire keyboard surface. Although the fabric keyboard 202 is of effectively continuous form, the central portion 701 can be considered as being effectively divided from the first lateral portion 301 and the second lateral portion 305 by the bending of the fabric keyboard along the first axis indicated by reference to the dotted line 702 and the second axis indicated by dotted line 703 which corresponds to bend portions 307 and 308 respectively.

When an operator has finished using the device in the operational configuration, the device may be reconfigured back to the wrapped configuration by returning the self-erecting stand assembly to the flat position of the intermediate configuration. This procedure, in effect, folds the flexible connection cable over at base 508 about a third axis so that the hand-held processor is located adjacent to the central portion 701 of the keyboard. The second lateral portion is then bent around the edge of the hand-held processor about a first axis 702 and the first lateral portion is bent around the opposing surface about the second axis 703. The first axis and the second axis are substantially perpendicular to the third axis. The first and second lateral portions are then secured in the wrapped configuration.

FIG. 8

Figure 8:
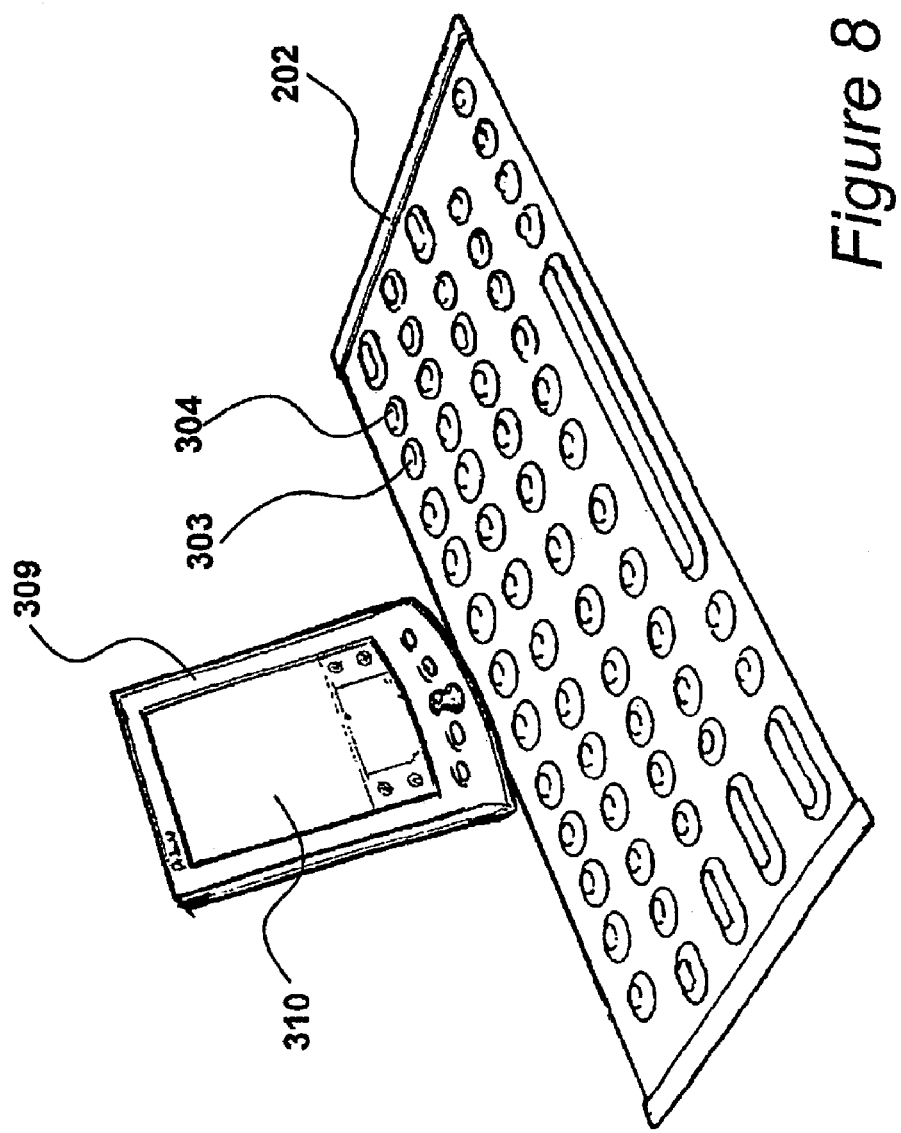
FIG. 8 is a front perspective view of the device shown in FIGS. 2 to 7 in the operational configuration.

A front perspective view of the device 102 in the operational configuration is shown in FIG. 8. The hand-held processor device 309 is centrally located with respect to the keyboard 202 and supported in an elevated position relative to the plane of the keyboard by the support leg 504.

In the operational configuration, all the keys on the surface of the keyboard are accessible so as to enable an operator full access to the keyboard. The application of a mechanical pressure by the operators' finger to a key registration device, such as, for example 303 or 304, results in the transmission of an alpha numeric or function data entry to the hand-held processor 309 which is displayed on the screen 310.

In some modes of operation, the hand-held processor displays a keyboard on its LCD display screen 310 and individual keys may be selected by manual operation of a stylus 410 upon the screen 310, for example, as in the intermediate position shown in FIG. 4. The purpose of keyboard 202 is to effectively replace the function of this displayed keyboard thereby allowing an operator to make use of the keyboard by direct application of their fingers, in a manner substantially similar to the operation of a standard manual keyboard. In this way, the entry of alpha numeric data can take place more rapidly and in a way which is generally more familiar to operators' and users.

A further important feature of the keyboard 202 is also shown in FIG. 8. The key registration devices such as 303 and 304 are relatively small truncated cone projections arranged in a spaced apart configuration on the surface of the keyboard 202. This configuration is preferable as it is necessary that the key registration devices are sufficiently small and sufficiently spaced so as to prevent undue compression of keys occurring on bending the fabric keyboard. In this regard, it will be evident that large bulky key registration devices upon bending will be compressed together and may require a greater force to be applied to form the bends and a strong securing means to retain the keyboard in the wrapped configuration. Accordingly, the keyboard as a whole should be configured to minimise the compression of the keys during bending to enable a bend to be readily formed.

A final important feature of the embodiment described in reference to FIGS. 2 to 8 is that the hand-held processor device remains connected to the keyboard during all the bending operations (ie it can remain permanently connected during normal use) and obviates any requirement to connect and disconnect the processor during the reconfiguration processes.

FIG. 9

Figure 9:
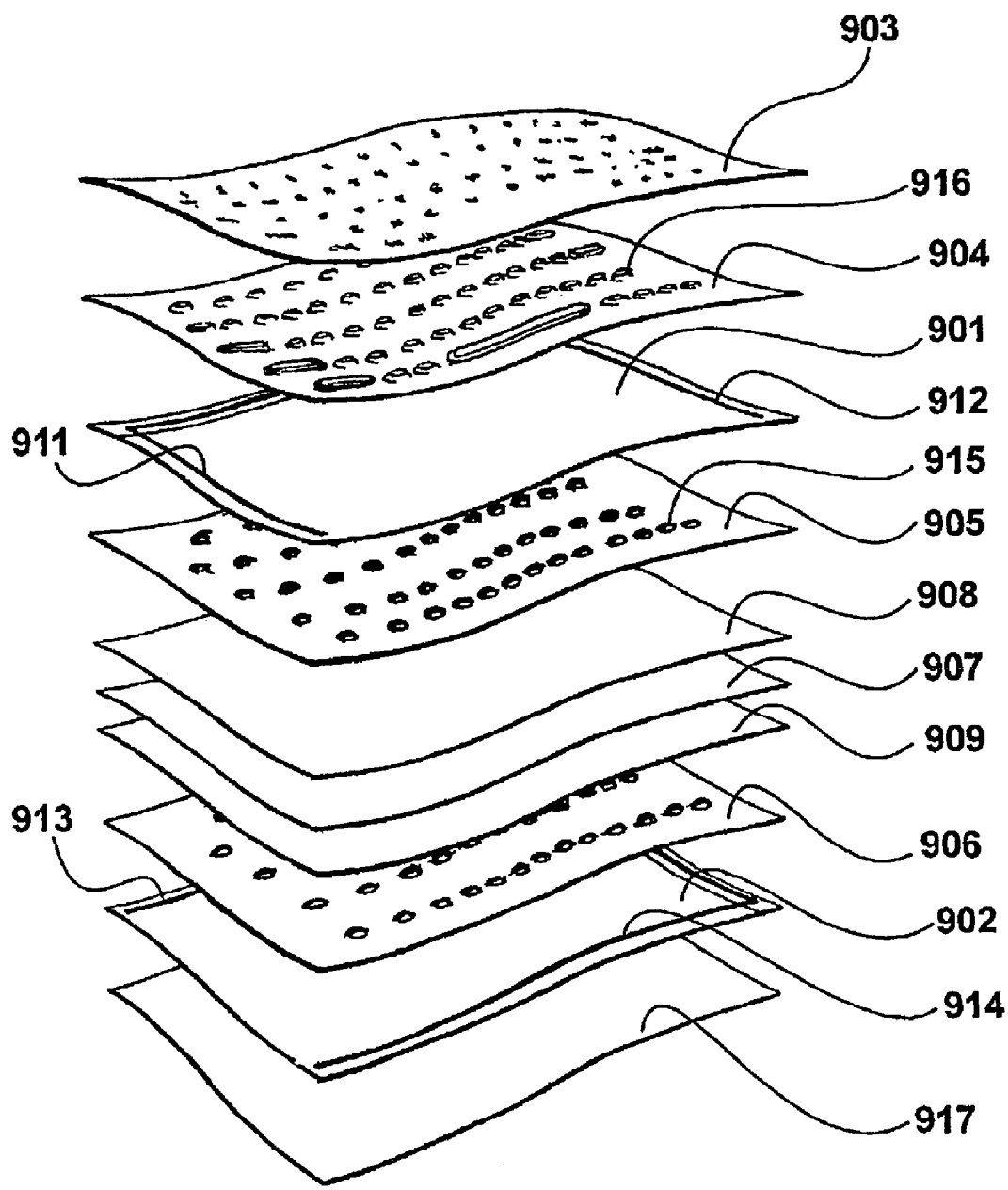
FIG. 9 is an exploded perspective view of the fabric keyboard 202 shown in FIG. 8.

An exploded perspective view of the keyboard of FIG. 8, illustrating its constituent layers, is shown in FIG. 9. The fabric keyboard 202 comprises ten individual constituent layers, including a first electrically conductive layer 901 and a second electrically conductive layer 902. Both of the electrically conductive fabric layers 901 and 902 have electrically conductive carbon coated fibres woven or knitted together such that each conductive layer is capable of conducting an electrical current in any direction along the plane of that individual layer.

The first electrically conductive layer 901 has conductive tracks 911 and 912 forming an electrical contact along the left and the right edges of the fabric keyboard respectively. The conducting tracks may be fabricated from fabric coated with conductive metals, such as silver or nickel. Material of this type is readily available and is used extensively for shielding equipment from electromagnetic interference. The tracks are secured to the conductive layers 901 and 902 using a conductive adhesive.

The tracks 911 and 912 are highly conductive compared with the fabric of sheets 901 and 902. Accordingly, a voltage gradient may be applied across the first electrically conductive layer 901 between the right and left edges of the detector (ie in an X-axis direction). The second electrically conductive layer 902 has conductive tracks 913 and 914 providing electrical contact along the top and bottom edges of the fabric layer respectively. Accordingly, a voltage may be applied across the second electrically conductive fabric layer 902 in a direction perpendicular to the voltage which is applied across the first electrically conductive layer 901 (ie the voltage across layer 902 is in the Y-axis direction).

The uppermost layer of the fabric keyboard is a continuous fabric layer 903 which has printed on its upper surface graphical representations corresponding to the alpha numeric keys of the keyboard. The graphical representations are preferably screen printed onto the fabric layer and, during the preferred construction process, the printing of the alphanumerical graphical representations is performed once the fabric keyboard has been assembled. Furthermore, the fabric layer 903 is preferably made from a stretchable and heat formable fabric so as to enable the fabric to be manipulated to receive the protrusions of the over centre moulding layer 904.

The over centre moulding layer 904 is, in this embodiment, a continuous silicone rubber sheet having key registration device mouldings protruding on its upper surface. The key registration device mouldings protruding from the upper surface layer 904 are specifically moulded so as to align with the alpha numerical graphical representations shown on the uppermost layer 903.

There are five layers located in between the first electrically conductive layer 901 and the second electrically conductive layer 902. A first masking layer 905 and a second masking layer 906 contact the innermost surfaces of the electrically conductive layers 901 and 902 respectively. Both masking layers 905 and 906 are composed of a flexible tear-resistant fabric with a laminate coating of polyurethane applied to one surface of the fabric. In an alternative embodiment, masking layers 905 and 906 are sheets of polyurethane alone without any fabric constituent.

A series of circular holes 915 have been punched through the masking layers 905 and 906. Each of these holes is located so as to align with a corresponding key registration device moulding 916 of layer 904. During the use of the keyboard, the masking layers prevent electrical contact occurring between the central conducting layer 907 and either of the outer conducting layers 901 and 902, except at locations which correspond to keys. Therefore, accidental compression of the keyboard at locations between the keys does not affect the operation of the keyboard.

Located in between the masking layers 905 and 906 are insulating mesh layers 908 and 909. The insulating layers 908 and 909 are woven or knitted with a relatively wide spacing between fibres so that the conductive layers are separated while at the same time allowing conduction to take place between the conducting layers when mechanical pressure is applied. The presence of these insulating layers ensures that the overall construction may be folded and flexed or wrapped around objects without causing the two conductive layers to be brought into electrical contact and thereby producing an erroneous contact identification.

Located between the insulating mesh layers 908 and 909 is a central conductive layer 907 which is configured to conduct an electric current from the first electrically conductive fabric layer 901 to the second electrically conductive layer 902 (ie in the Z-axis direction) whilst preventing lateral current flow along the plane of the sheet (i.e. in the X and Y axis directions).

The central conductive layer 907 is constructed by knitting a polyester yarn of twenty-four decitex filaments having a single conductive filament twisted therein, such that the conductive filament appears relatively randomly in the completed knitted product. In addition, the central conductive layer 907 has a conductance perpendicular to the plane of the device (On the Z-axis) that increases as it is placed under pressure thereby facilitating conduction between the layers during a mechanical interaction.

A final fabric layer 917 forms the under surface of the fabric keyboard and, in the present embodiment, also forms the external surface when the device 102 is in the wrapped configuration. This layer is preferably a durable fabric cover configured to provide protection to the inner encapsulated layers of the fabric keyboard. In an alternative embodiment, the under surface of layer 917 is laminated with patches of rubber to provide a high co-efficient of friction between the keyboard and any surface onto which the keyboard is placed.

The ten layers forming the fabric keyboard are mechanically secured together by an adhesive provided around the perimeter edges of the constituent fabric layers.

FIG. 10A

Figure 10A:
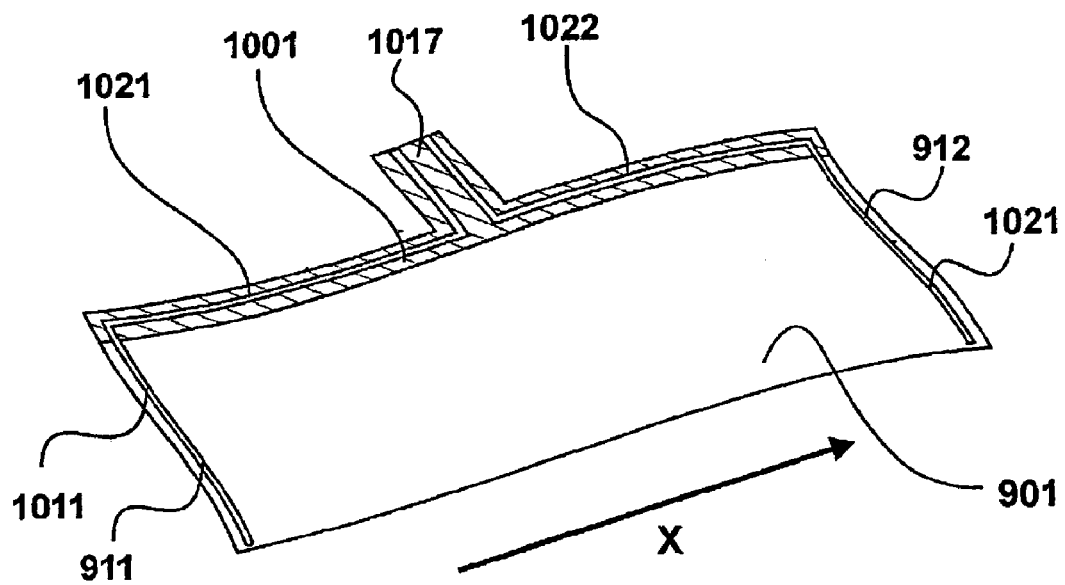
FIG. 10 details the electrically conductive fabric layers 901 and 902 shown in FIG. 9.

The first electrically conductive fabric layer 901 is shown in more detail in FIG. 10A. Two conductive tracks 911 and 912 form the electrical contacts with the conductive fibres of fabric layer 901. A contacting portion 1011 of conductive track 91.1 contacts the left edge of fabric layer 901. A conduction portion 1021 of conductive track 911 is channeled into the flexible cable 1017 and prevented from contacting the electrically conductive fabric layer 901 by insulation strip 1001 that runs along the upper edge of fabric layer 901, and shown as a shaded area in FIG. 10A.

Similarly, the conductive track 912 contacts the electrically conductive fabric along the right edge of fabric layer 901 over a contacting portion 1021. A conduction portion 1022 extends into flexible cable 1017 and is prevented from contacting the electrically conductive fabric layer 901 by insulation strip 1001 that runs along the upper edge of fabric layer 901. This enables voltages to be applied between the conductive tracks 911 and 912 to provide a voltage gradient in the X-axis direction.

FIG. 10B

Figure 10B:
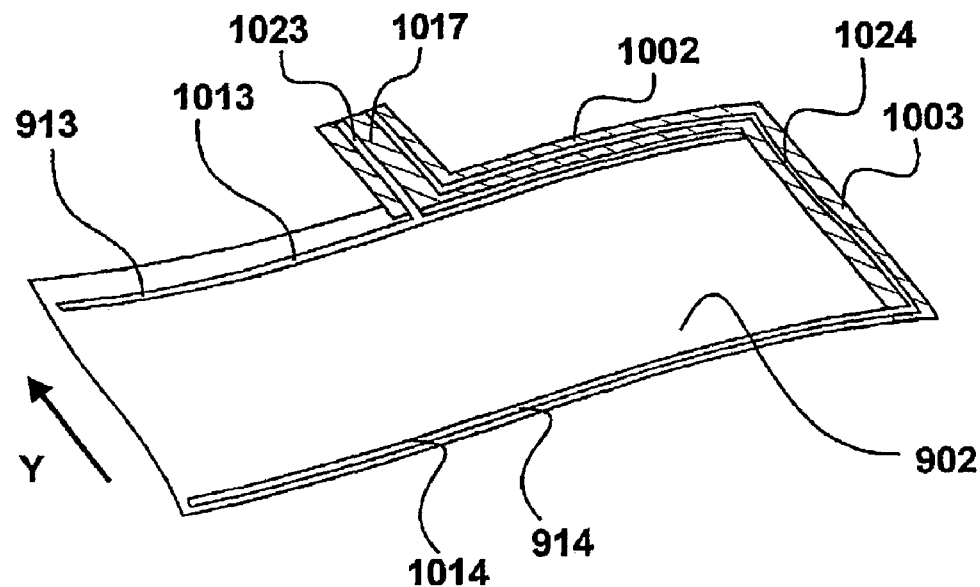

The second electrically conductive layer 902 is shown in more detail in FIG. 10B. Electrical connection is formed with the fabric layer 902 by the two conductive tracks 913 and 914. Conductive track 913 forms an electrical contact with the top edge of the electrically conductive fabric 901 via contacting portion 1013. A conduction portion 1023 of conductive track 913 extends over insulation strip 1002 that extends along the top edge of the fabric layer, and enters the flexible cable 1017. Conductive track 914 forms an electrical connection with bottom edge of the fabric sheet 902 via its contacting portion 1014. A conduction portion 1024 of conductive track 914 extends along the right edge of the fabric sheet and t1~e top edge of the fabric sheet and enters into the flexible fabric cable 1017. The conduction portion 1024 of conductive track 914 is electrically insulated from the fabric layer by insulating strips 1002, which extends along the top edge, and 1003, which extends along the right edge, of layer 902.

Accordingly, voltages may be applied between the conductive tracks 913 and 914 so as to provide a voltage gradient across the electrically conductive fabric layer 902 from top to bottom in the Y-axis direction.

In this embodiment, only four connections are possible to the fabric keyboard, two connections to conductive tracks 911 and 912 of fabric layer 901, and two connections to conductive tracks 913 and 914 of fabric layer 902.

FIG. 11

The interface circuit 1103 located in the hand-held processor engaging portion of the self-erecting stand assembly 501 is detailed in FIG. 1b. The interface circuit comprises a peripheral interface controller (PIC) 1102 which is connected to a serial communication output 1103 and electrical connections 1104, 1105, 1106 and 1107 configured to supply and receive the necessary voltages to the conductive tracks 911, 912, 914 and 913 respectively. The PIG is powered by the hand-held processor device which, in the case of a Palm$^{RTM}$ Vx Processor is within the region of 3.7 to four volts. Four volts will be referred to hereinafter in the description.

The PIC 1102 is a programmable controller of the type PIC16C711. The PIC 1102 operates under the control of a program which controls the parameters of the keyboard which the interface circuit 1103 is configured to measure. Parameters under investigation will be discussed further in reference to FIGS. 12 to 16.

Under control of the PIC 1102, the necessary output voltages can be supplied to electrical connections 1104, 1105, 1106 and 1107 via pins one, two, ten, eleven, twelve and thirteen of the PIG. The PIG includes an analogue to digital converter which is used to process analogue voltages received at pins seventeen and eighteen. The input pins seventeen and eighteen receive outputs from high impedance buffers 1108 and 1109 respectively. The buffers 1108 and 1109 are half of unity gain operational amplifiers of the type TL062, and provide a high impedance buffer between the sensor output voltages and the PIC 1102 input ports.

Connection to pins one and two occurs via resistors 1110 and 1111 respectively. Resistors 1110 and 1111 are selected according to the resistance of the keyboard as measured from a conducting track attached to one fabric layer 901 to a conducting track attached to the second fabric layer 902 while a typical mechanical interaction pressure, ie a keypress is applied. A value of 10 Kohms is typical for resistors 1110 and 1111.

The PIC 1102 has an external crystal oscillator (not shown) running at four MHz connected across pins fifteen and sixteen. Positive four volts is supplied to pin fourteen and ground is connected to pin five. Pin four (the internal reset input) is held at positive four volts via a series resistor of one hundred ohms.

The PIC 1102 is programmed to supply and receive the necessary voltages to the conductive tracks 911, 912, 914 and 913 of the conductive layers 901 and 902. By this means the interface circuit is able to determine a measure, denoted by ~Z, of the pressure applied to the keyboard, and if this value is sufficiently large the interface circuit interprets this as a key-press. When a key-press is detected the interface circuit performs a measurement of the X and Y location of where the pressure is being applied. The PIC is further configured to supply data to the output serial port 1103 relating to the position of key-presses detected or the absence of a key-press.

FIGS. 12A, 12B, 12C and 12D

An overview of the measurements made by interface circuit 1103 is illustrated by FIGS. 12A, 12B, 12C and 12D. The outer conductive layers 902 and 901 are represented schematically by potentiometers 1201 and 1202 and the resistance of the conductive path between the outer layers at the location of the applied force is represented by variable resistor 1203.

Figure 12A:
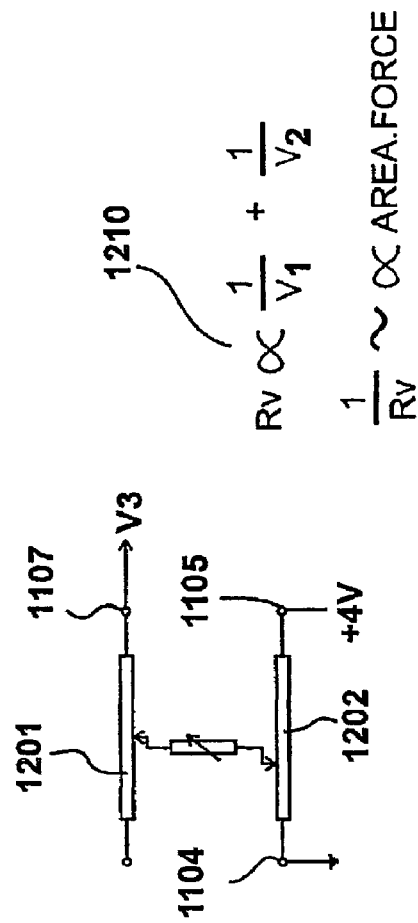
FIGS. 12A, 12B, 12C and 12D detail schematically the pressure and positional measurements that can be made by the interface circuit identified in FIG. 11.
Figure 12B:
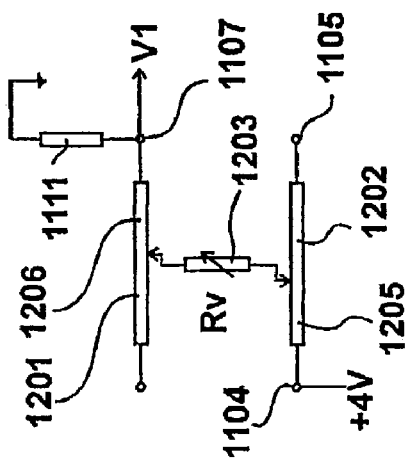

A first measurement is shown in FIG. 12A. Four volts are applied to connector 1104, while connector 1105 remains disconnected. Connector 1107 is connected to ground via a resistor 1111 of known value. Thus, current flows from connector 1104 through a first part of layer 901 indicated by a first part 1205 of potentiometer 1202, through the conductive path indicated by variable resistor 1203 having resistance Rv, through a first part of layer 902, indicated by a first part 1206 of potentiometer 1201 and through the known resistor 1111. The voltage, V1 appearing at connector 1107 is measured and since this is equal to the voltage drop across resistor 1111, V1 is directly proportional to the current flowing from connector 1104. A second measurement is shown in FIG. 12B. Four volts are applied to connector 1106, while connector 1107 is disconnected. Connector 1105 is connected to ground via a resistor 1110 of known resistance. The voltage V2, dropped across resistor 1110 is measured. Voltage V2 is directly proportional to the current flowing through a second part of layer 902 indicated by a second part 1208 of potentiometer 1201, through the conductive path indicated by variable resistor 1203 having resistance Rv, through a second part of layer 901 indicated by a second part 1209 of potentiometer 1202 and through resistor 1110.

The sum of the resistance of first part 1206 and second part 1208 of potentiometer 1201 is approximately equal to the resistance between contacting portions 1013 and 1014 on layer 902, and is therefore substantially constant during the measurements, since they occur in rapid succession. Similarly, the sum of the resistance of first part 1205 and second part 1209 of potentiometer 1202 is approximately equal to the resistance between contacting portions 911 and 912 on layer 901, and is also substantially constant during the measurements. As a result, the relationship 1210 exists between the resistance Rv, of the conductive path between the outer layers, and the measured voltages V1 and V2, ie the resistance Rv between the outer layers is proportional to the sum of the reciprocal of voltage V1 and the reciprocal of voltage V2.

In general, depending upon the type of position sensor used, the resistance Rv depends upon area of the applied pressure or a function of the area and the force as illustrated by relationship 1211. Thus, from the voltage measurements V1 and V2 a measure which is dependent on the force applied to the keyboard is determined.

Figure 12C:
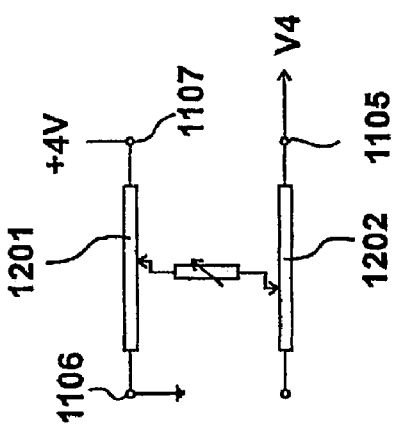

A third measurement is shown in FIG. 12C. Four volts is applied to connector 1105 while connector 1104 is grounded, and so a potential gradient is produced across layer 901. A voltage measurement is made at connector 1107. Since the interface circuit makes use of the high impedance buffer 1108, the voltage appearing on layer 902 at the position of the applied force is determined. This voltage, V3 is directly proportional to the distance of the centre of the applied force from contacting portion 911 and indicates its X-axis position.

Figure 12D:
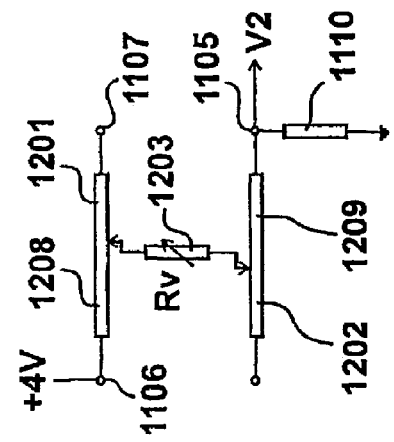

A fourth measurement is shown in FIG. 12D. Four volts are applied to connector 1107 and connector 1106 is grounded. A voltage measurement is made of voltage V4 appearing at connector 1105. Voltage V4 is directly proportional to the distance of the centre of the applied force from contacting portion 414 and indicates its Y-axis position. Therefore, voltage V3 and V4 provide information as to the two-dimensional position of the applied force on the sensor, i.e. voltages V3 and V4 represent X and Y values for the centre of the position of the applied force, representing a key-press.

FIG. 13

Figure 11:
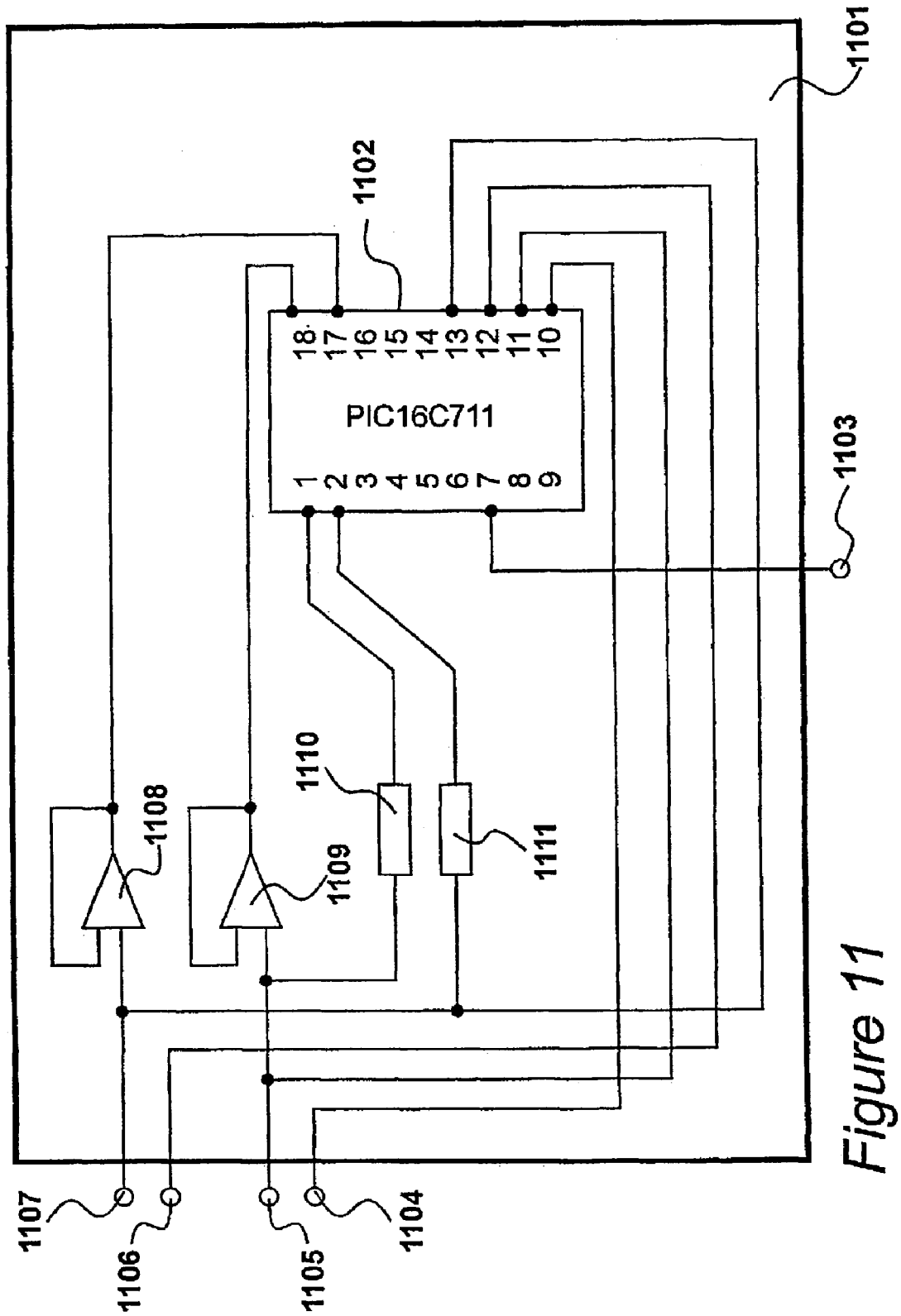
FIG. 11 shows a detailed view of the interface circuit 503 of FIG. 5.
Figure 13:
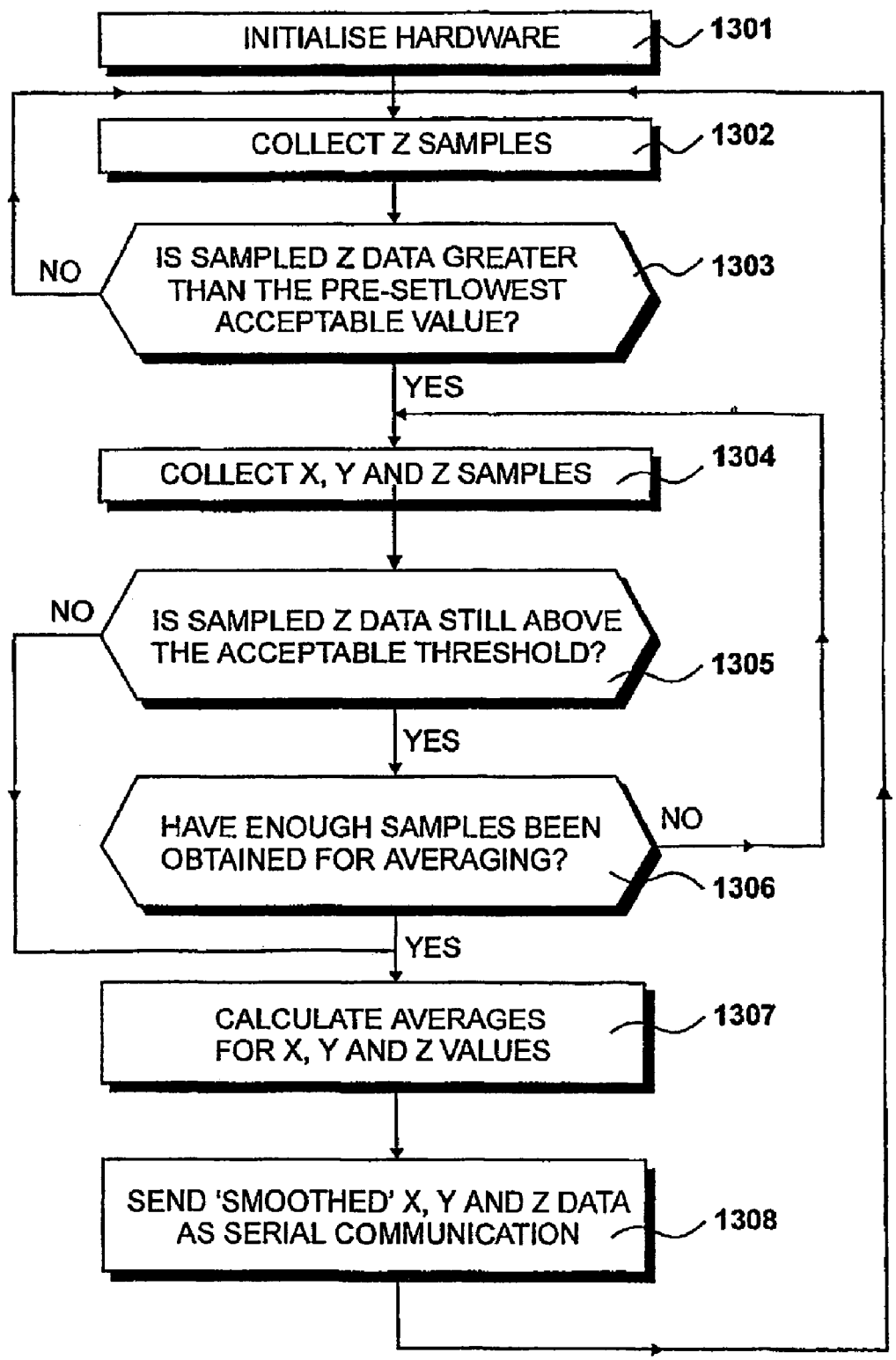
FIG. 13 is a flow chart illustrating a mode of operation performed by the P10160711 processor shown in FIG. 11.

The program running within the peripheral interface circuit of FIG. 11 is outlined in the flow chart of FIG. 13. At step 1301 the hardware is initialised and this process is detailed later with reference to FIG. 14. At step 1302 the circuit 103 measures values of voltages V1 and V2 and calculates a Z value of the interaction. The details of step 1302 are described later with reference to FIG. 15. At step 1303 a question is asked as to whether the Z data is greater than a predetermined value. If the answer to this question is no then the program returns to step 1302. Thus the circuit measures Z values until a Z value greater than a predetermined value is detected. If the answer to the question at step 1303 is yes then the circuit measures voltages V1, V2, V3 and V4 and calculates a Z value at step 1304. Step 1304 is described later in more detail with reference to FIG. 16. At step 1305 a question is asked as to whether the calculated Z value is still above the predetermined value. If the answer to the question is yes, a further question is asked at step 1306 as to whether enough samples have been obtained. Typically, between three and ten sets of samples are taken, with lower numbers of sets of samples being taken when a fast response time is required. If the answer to the question at step 1306 is no then the program returns to step 1304 and a further set of measurements are made. When the answer to the question at step 1306 is yes, or when the answer to the question at step 1305 is no, then the program calculates average values of the samples of the voltages V3 and V4, and of the values of Z which have been collected. Thus, the program measures a predetermined number of voltages before finding the average values, or if the Z value drops below a predetermined value, the average values are calculated immediately. By using the average of a number of samples the effect of mains power electromagnetic interference or other such environmental noise may be minimised.

A simple calculation to find an 'average' value for say the X value, is to find the median of the maximum and minimum values of the stored values V3, ie a 'smoothed' value for X is found by adding the maximum stored value of V3 to the minimum stored value of V3 and dividing the result by two.

To further improve accuracy, values of X, Y, and Z that differ by a large amount from their immediately preceding and immediately subsequent values are excluded from the calculations of the average. In addition, known methods of eliminating mains electricity supply interference may be applied to the signals received from the sensor.

At step 1308 the averaged values for V3 and V4 representing X and Y positional co-ordinates and the averaged values of the Z data are output at the serial communication output 1601. The program then returns to step 1302 and looks for an indication of further mechanical interaction.

FIG. 14

Figure 14:
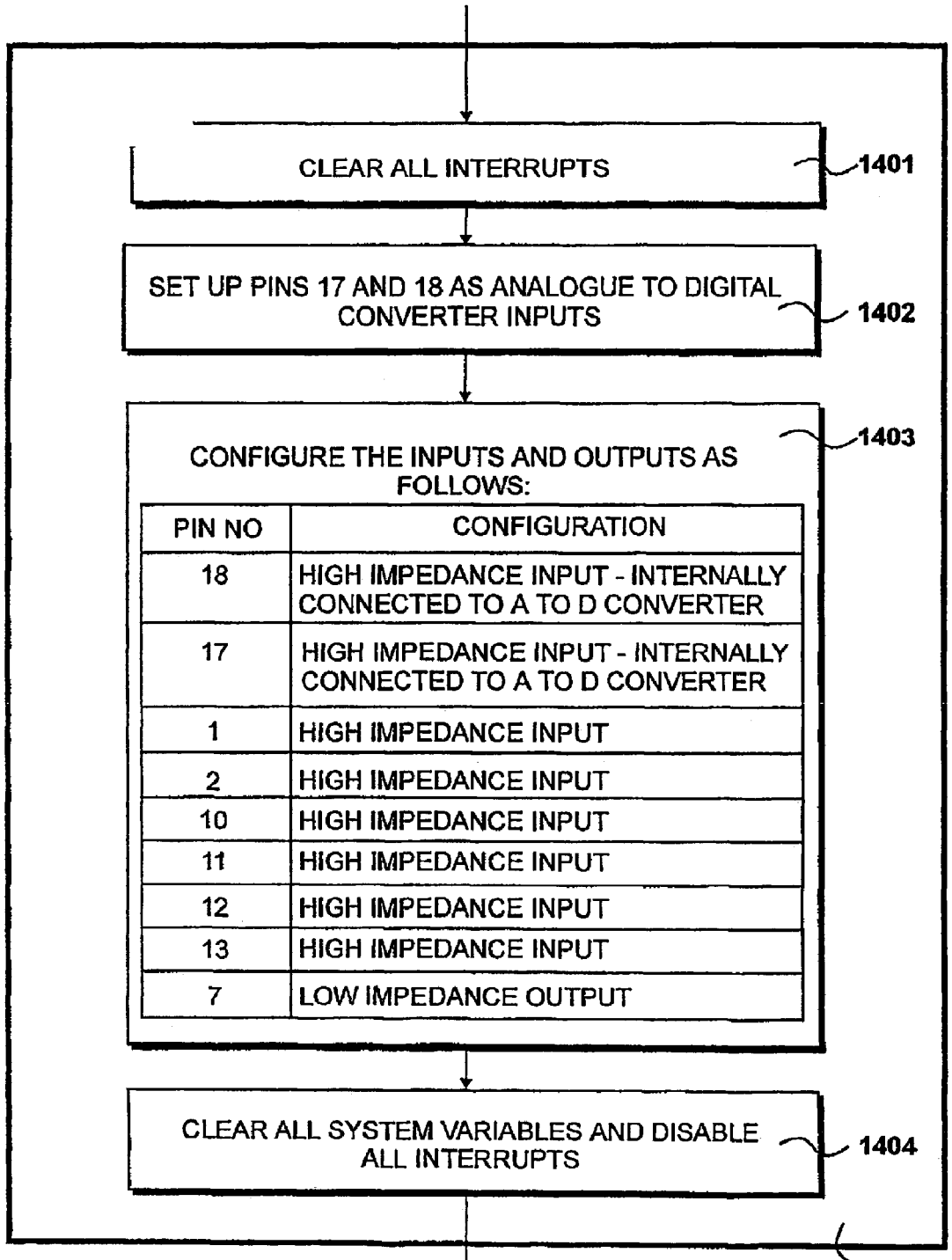
FIG. 14 is a flow chart detailing the initialisation procedure performed by the P10160711 processor at step 1301 shown in FIG. 13.

Step 1301 of FIG. 13 is shown in further detail in FIG. 14. Within the initialisation step 1301, at step 1401 the interrupts are cleared and then at step 1402 pins seventeen and eighteen are set up as analogue to digital converter inputs. The micro ports of a PIC16C711 may be configured as low impedance outputs or high impedance inputs. When in high impedance input mode, pins seventeen and eighteen can be programmed to connect via an internal multiplexer, to the analogue to digital converter. At step 1403 the ports which are to be used as inputs or outputs are configured in their initial state. At step 1404 all system variables are cleared and all interrupts are disabled.

FIG. 15

Figure 15:
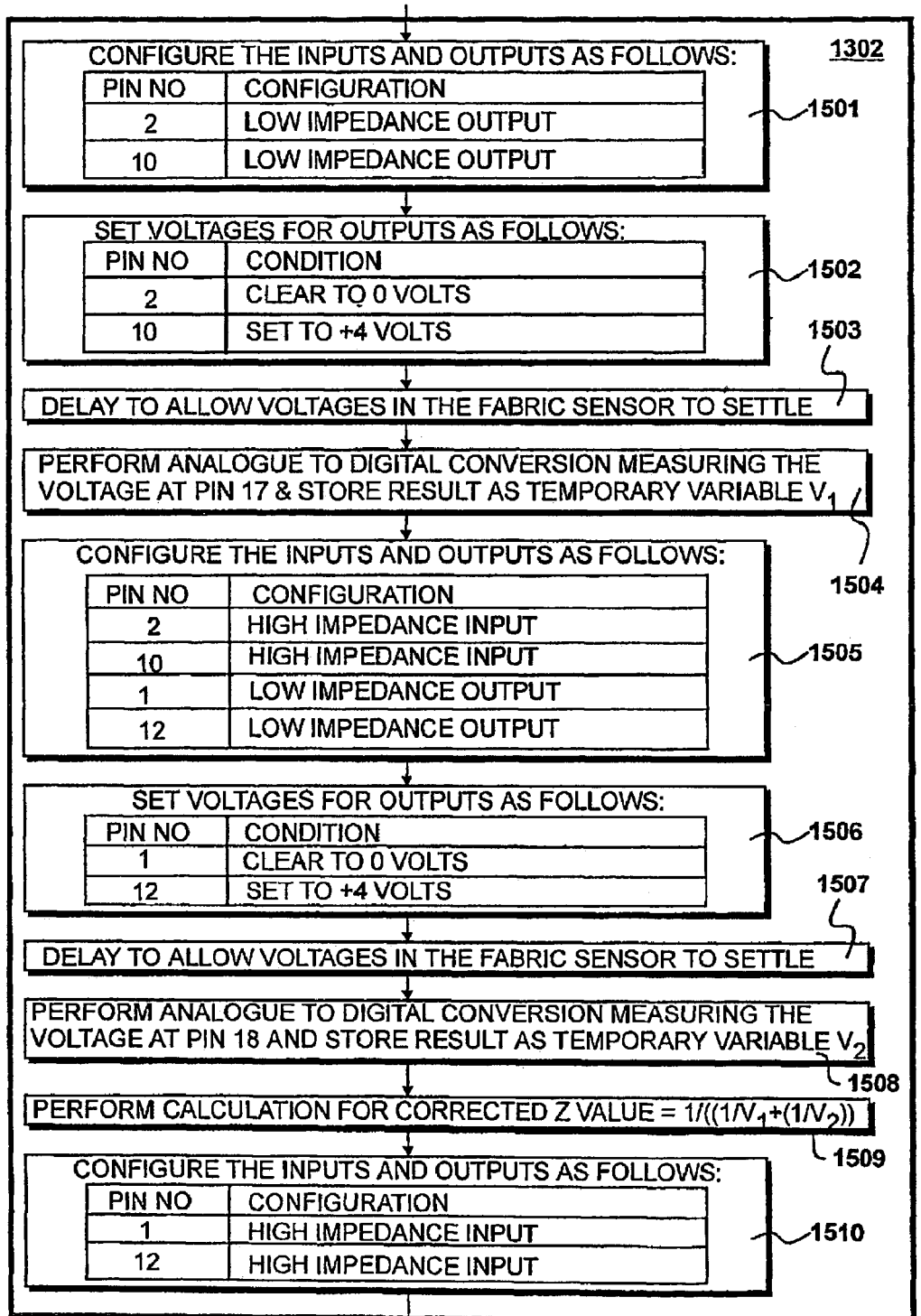
FIG. 15 is a further flow chart detailing the configurations of the P10160711 processor for the collection of Z value data as indicated in step 1302 of FIG. 13.

Step 1302 of FIG. 13 is shown in further detail in FIG. 15. Within step 1302, at step 1501, the ports corresponding to pins two and ten are reconfigured as output ports and at step 1502 pin two is set to zero while pin ten is set to positive four volts. Thus connector 1107 is grounded via resistor 1111 and four volts are applied to connector 1104. At step 1503 a time delay (typically of two hundred microseconds in a sensor measuring ninety millimetres by two hundred and forty millimetres with an outer layer resistance of 3.5 Kohms) is provided to allow voltages to settle before the voltage at pin seventeen is measured and stored at step 1504. Thus voltage V1 present at connector 1107 is measured and stored.

At step 1505 pins two and ten are reconfigured as high impedance inputs while pins one and twelve are reconfigured as low impedance outputs. At step 1506 the voltages on pins one and tweve are set to zero and positive four volts respectively. Thus, connector 1105 is grounded via resistor 1110 while four volts are supplied to connector 1106. A suitable time delay, equivalent to that at step 1503, is provided at step 1507 before the voltage at pin eighteen is measured and stored at step 1508. Thus, the voltage present on connector 1105 is measured and stored as voltage V2. At step 1509 a Z value is calculated from stored voltages V1 and V2, and then stored. The pins one and twelve are reconfigured back to their initial state of high impedance inputs at step 1510.

FIG. 16

Figure 16:
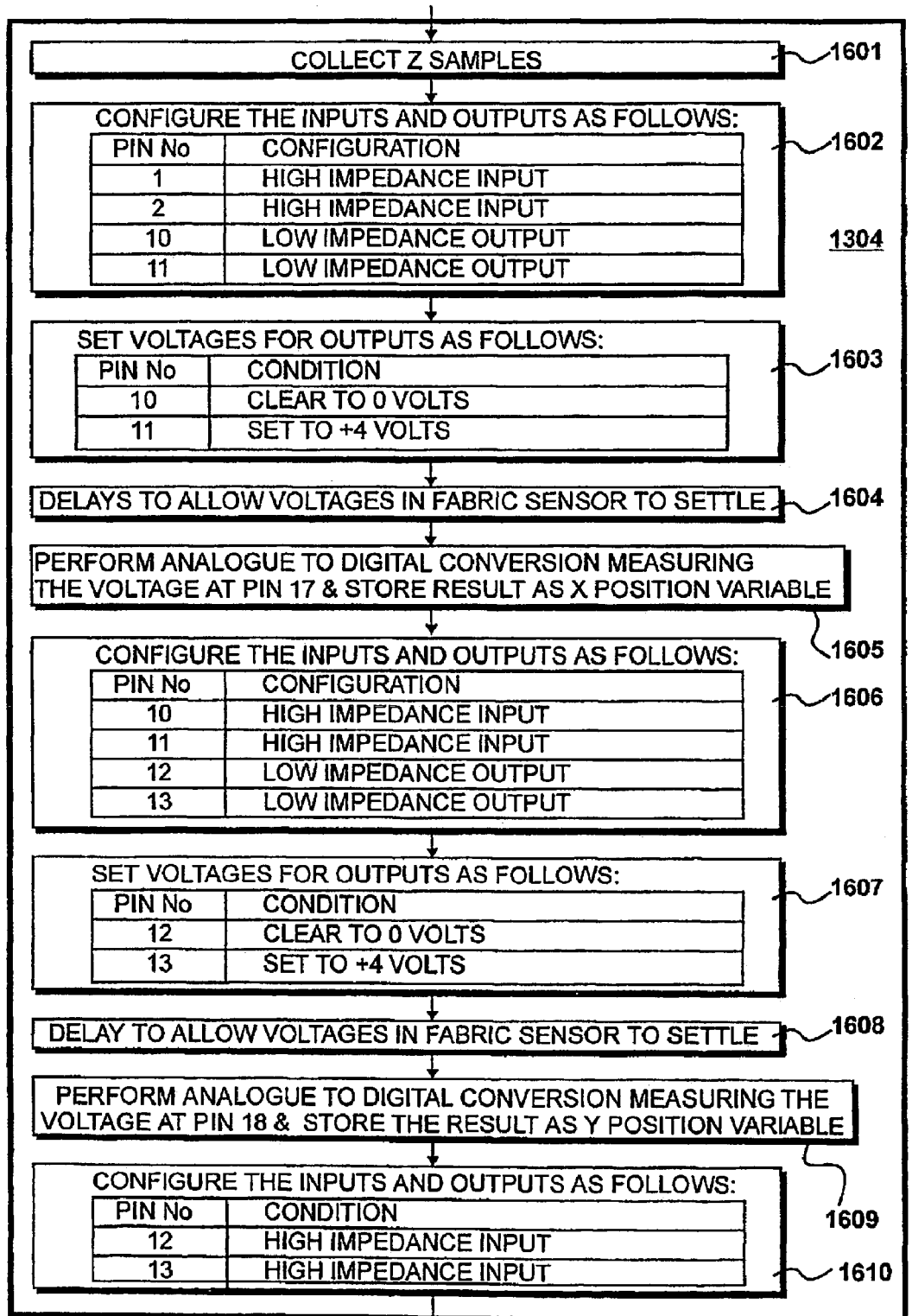
FIG. 16 is a flow chart detailing the configuration of the P10160711 processor for the collection of X, Y co-ordinate positional data and Z axis data as indicated in step 1304 of FIG. 13.

Step 1304 of FIG. 13 is shown in further detail in FIG. 16. Within step 1304, at step 1601 a Z value is collected in the same manner as at step 1302. At step 1602 pins one and two are reconfigured as high impedance inputs and pins ten and eleven as low impedance outputs. At step 1603 pin ten is set to zero volts and pin eleven is set to positive four volts. Thus, four volts are supplied to connector 1105 while connector 1104 is grounded. A delay is then provided at step 1604, (of typically two hundred microseconds for a device measuring ninety millimetres by two hundred and forty millimetres) to allow voltages in the sensor to settle before the voltage on pin seventeen is measured at step 1605. Therefore, a voltage V3 present on connector 1107 is measured which provides an indication of the X position of the applied force.

Pins ten and eleven are then reconfigured as high impedance inputs and pins twelve and thirteen are reconfigured as low impedance outputs at step 1606. The voltage on pin twelve is then set to zero while the voltage on pin thirteen is set to four volts at step 1607. Thus, four volts are supplied to connector 1107 while connector 1106 is grounded. A time delay is provided at step 1608, similar to that at step 1604, before the voltage appearing at pin eighteen is measured at step 1609. Thus, a voltage V4 present on connector 1105 is measured which provides an indication of the Y position of the applied force. Pins twelve and thirteen are then reconfigured back to their initial state of high impedance inputs.

Therefore, by the method described with reference to FIGS. 13 to 16 the interface circuit is able to make voltage measurements V3 and V4 which provide an indication of the position of the force applied to a fabric sensor, and measure voltages V1 and V2 which are proportional to currents passing through the sensor and provide information as to a second characteristic of the applied force. The second characteristic may be the pressure with which the force is applied, or a combination of the size of the force and the area. Furthermore, the circuit combines the voltages V1 and V2 to determine a Z value representative of the second characteristic.

The circuit 503 provides output data representative of X and Y position of the applied force and the Z value. However, in an alternative embodiment the interface circuit provides output data corresponding to the measured voltages V1, V2, V3 and V4.

Figure 17A:
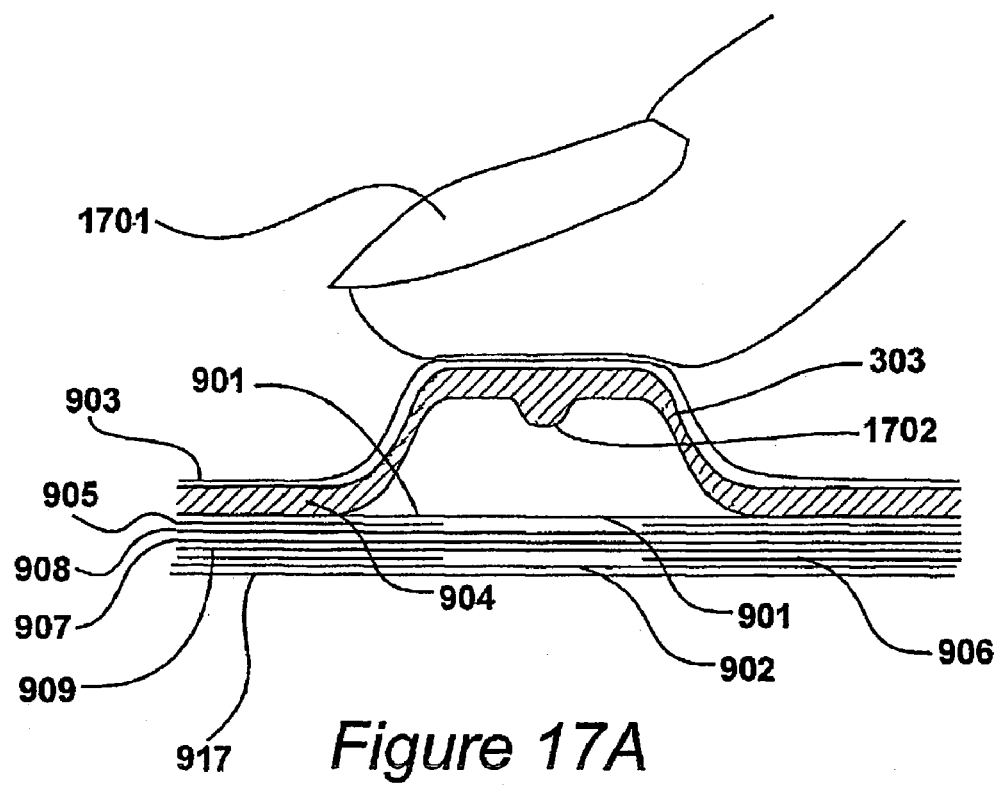
FIGS. 17A and 17B show a cross-sectional view taken through a key registration device of the fabric keyboard 202 during a key press.
Figure 17B:
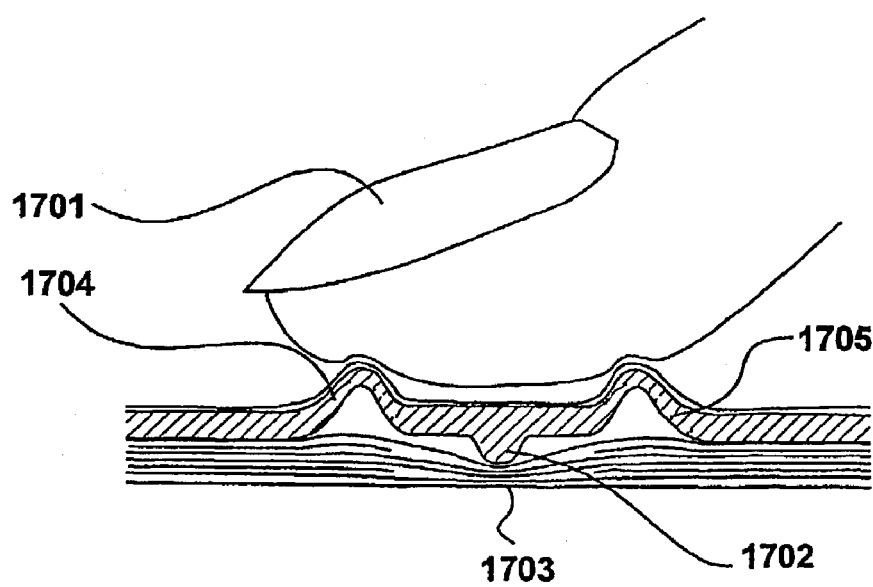

FIGS. 17A and 17B

The process by which the electrically conductive layers 901 and 902 form an electrical contact following the depression of a key is shown in FIGS. 17A and 17B. The fabric keyboard 202 is shown in cross section through a key registration device 303. FIG. 17A shows an illustration of key 303 in the absence of a mechanical interaction. The key registration device 303 is moulded into the silicone rubber over centre moulding layer 904. Located underneath the over centre moulded layer 904 is, in order of occurrence, the first electrically conductive fabric layer 901, the first mask layer 905, the first insulating mesh layer 908, the central conductive layer 907, the second insulating mesh layer 909, the second mask layer 906, the second electrically conductive fabric layer 902, and the lower fabric layer 917. In contact with the upper surface of the over centre moulding layer 904 is the upper fabric layer 903. A graphical representation of the letter, numeral or function to which the key registration device 303 corresponds is printed onto the upper surface of fabric layer 903 to directly coincide with the centre of the key registration device protrusion 303. The lower surface of the key registration device protrusion 303 has a contact protrusion 1702 extending towards the electrically conductive layer 901.

An operator's finger 1701 is shown in FIG. 17A forming an initial contact with the upper surface of the key registration device protrusion 2601. Pressure is applied by the finger 1701 to the key registration device protrusion 303 causing the key registration device to flex in a downward direction towards the first electrically conductive layer 901 as shown in FIG. 17B. The contact protrusion 1702 mechanically compresses the first electrically conductive layer 901 into close contact with the first mesh layer 908 the central conductive layer 907, the second mesh layer 909, and the second electrically conductive fabric layer 902. It can be seen from FIG. 17B that the key registration device 303 and the associated contact protrusion 1702 are specifically aligned so as to facilitate a mechanical interaction bringing the electrically conductive layers closer together at region 1703 through a hole in the first and second masking layers 905 and 906. It should also be noted that the depression of the key registration device by the operators' finger and the resultant bend portions 1704 and 1705 provide tactile feedback to the operators' finger indicating that the appropriate key on the fabric keyboard has been pressed.

The result of the mechanical interaction forcing the first electrically conductive layer 901 and the second electrically conductive layer 902 into close contact is that a voltage applied to either layer will result in a current flowing from one layer to another and enable electrical measurements to be made and the positional co-ordinates of the mechanical interaction to be determined as previously described. The positional co-ordinate data is supplied to the hand-held processor via the interface circuit. The hand-held processor subsequently correlates the X and Y positional co-ordinate data obtained at the point of the mechanical interaction with a series of look-up tables so that the corresponding data input function corresponding to the key pressed can be determined.

In this regard, the insulating masking layers 905 and 906 limit the areas within which a mechanical interaction may result in a current flowing between the first and the second electrically conductive layers 901 and 902. Accordingly, an output will only be sent to the hand-held processor when a key is pressed and not following an accidental mechanical interaction at a point on the keyboard other than a key registration device. Therefore, the masking layers 905 and 906 prevent the transmission of ambiguous X and Y positional co-ordinate data correlating to positions around the pre-selected key registration devices and resulting in the correlation with a data input from the look-up table in response to an accidental mechanical interaction within the region around a key registration device.

Figure 18:
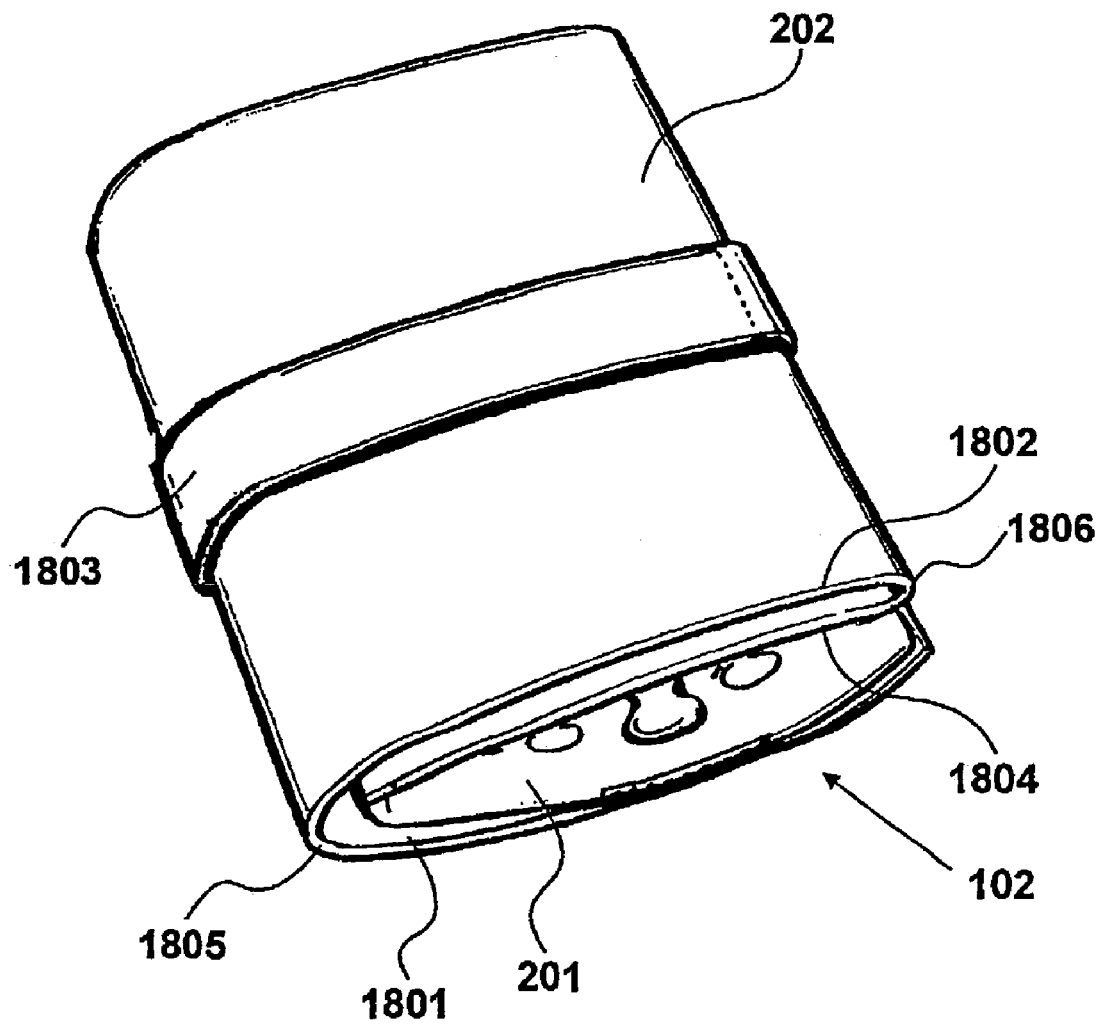
FIG. 18 shows a second embodiment of the present invention in the wrapped configuration.
Figure 19:
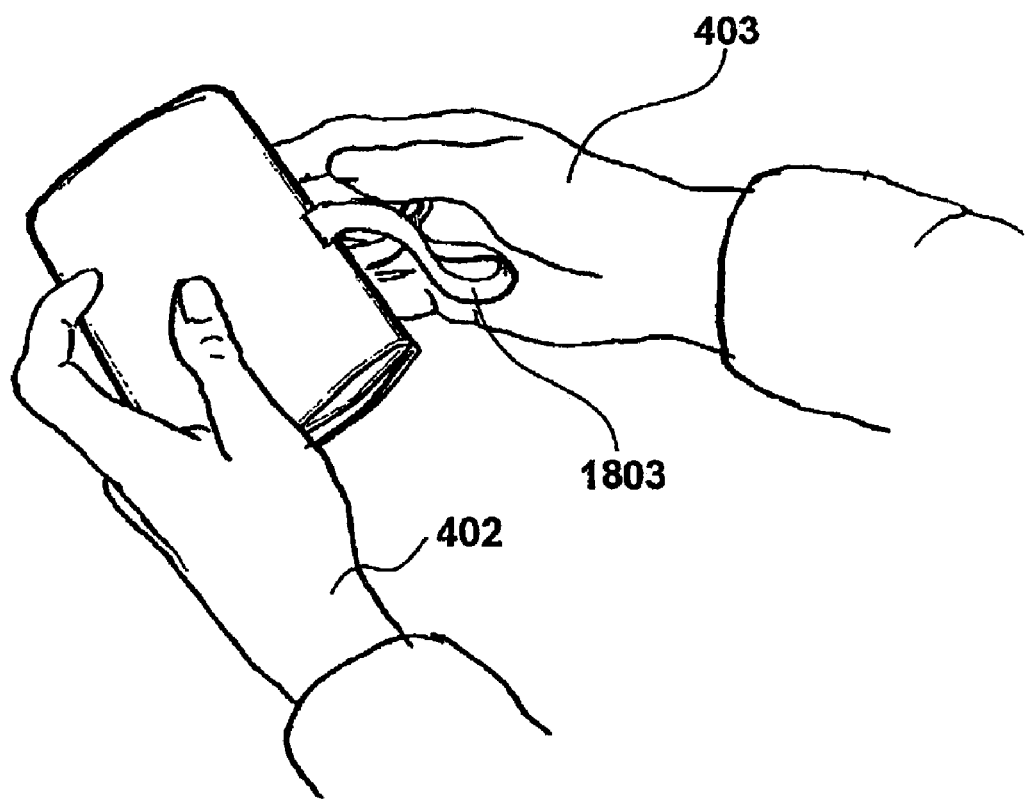
FIG. 19 shows the embodiment shown in FIG. 18 with the elastic strap 1803 released.
Figure 20:
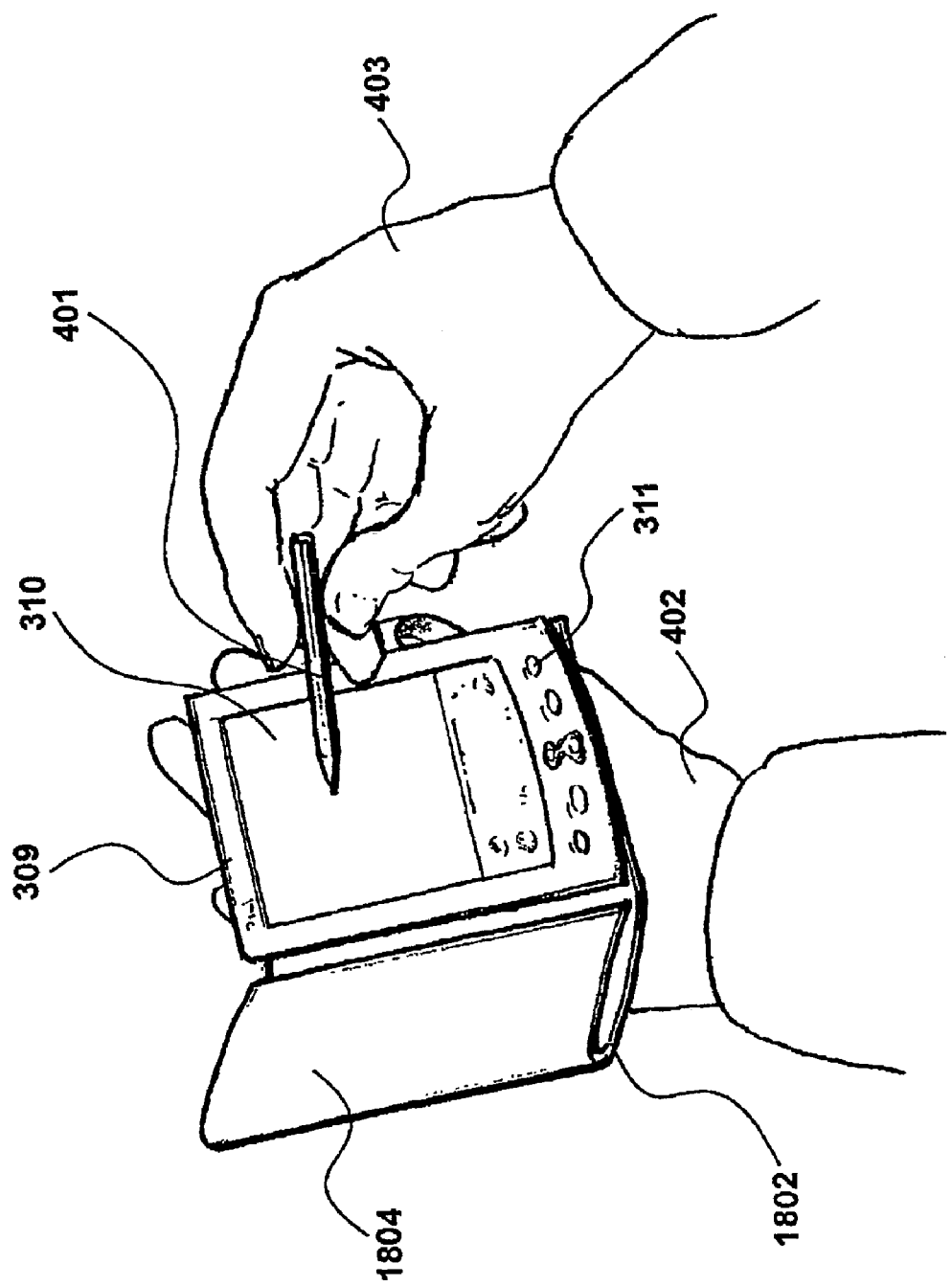
FIG. 20 shows the second embodiment of the invention in the intermediate configuration.

FIGS. 18, 19 and 20

FIG. 18 shows a further embodiment of the device 102 in a wrapped configuration. A hand-held processor 201, such as a Palm$^{RTM}$ VX processor manufactured by Palm Inc. is enveloped by a fabric keyboard 202. The fabric keyboard 202 of the present embodiment is divided into three separate portions by the bends formed in the fabric keyboard, namely a first bend 1805 formed along a first axis and a second bend on 1806 formed along a second axis. In the present embodiment, the first and second axes are disposed in a substantially parallel relationship to one another.

A first lateral portion 1801 contacts the back of the hand-held processor device 201 to form the rear protective cover. The first lateral portion 1801 extends through bend 1805 to the central portion 1802. The central portion 1802 further extends through bend 1806 to the second lateral portion 1804 which, in the wrapped configuration, contacts the front surface of the hand-held processor device 201. Hence, a protective cover is formed around the hand-held processor device 201 in the wrapped configuration by the first lateral portion which covers the rear of the device and the central and second lateral portions which form the front protective cover. The front protective cover and the rear protective cover are secured in position by the elastic strap 1803.

The first stage in un-wrapping the device 102 is to release the elastic strap 1803 by sliding the strap over the top of the device 102, as shown in FIG. 19.

Once the elastic strap 1803 has been released the front cover formed by central portion 1802 and second lateral portion 1804 can be folded back to reveal the front face of the hand-held processor device 309. This configuration of the device is known as the intermediate configuration and is as shown in FIG. 20. The front surface of the hand-held processor device 309 functions as the operator interface by which the operator can interact with the device by selecting icons on the screen 310 using the stylus 401, as shown in FIG. 20, or alternatively further functions may be selected using the interface buttons such as 311.

As in the previous embodiment, in the intermediate configuration the hand-held processor 309 is conveniently supported in the operators' hand 402. Accordingly, if the operator only wishes to use the hand-held processor alone (i.e. and not use the fabric keyboard 202) it is only necessary to unwrap the device 102 to the intermediate configuration in which the device may be conveniently held in one hand leaving the other hand free to interact with the user interface of the hand-held processor device.

FIG. 21

Figure 21:
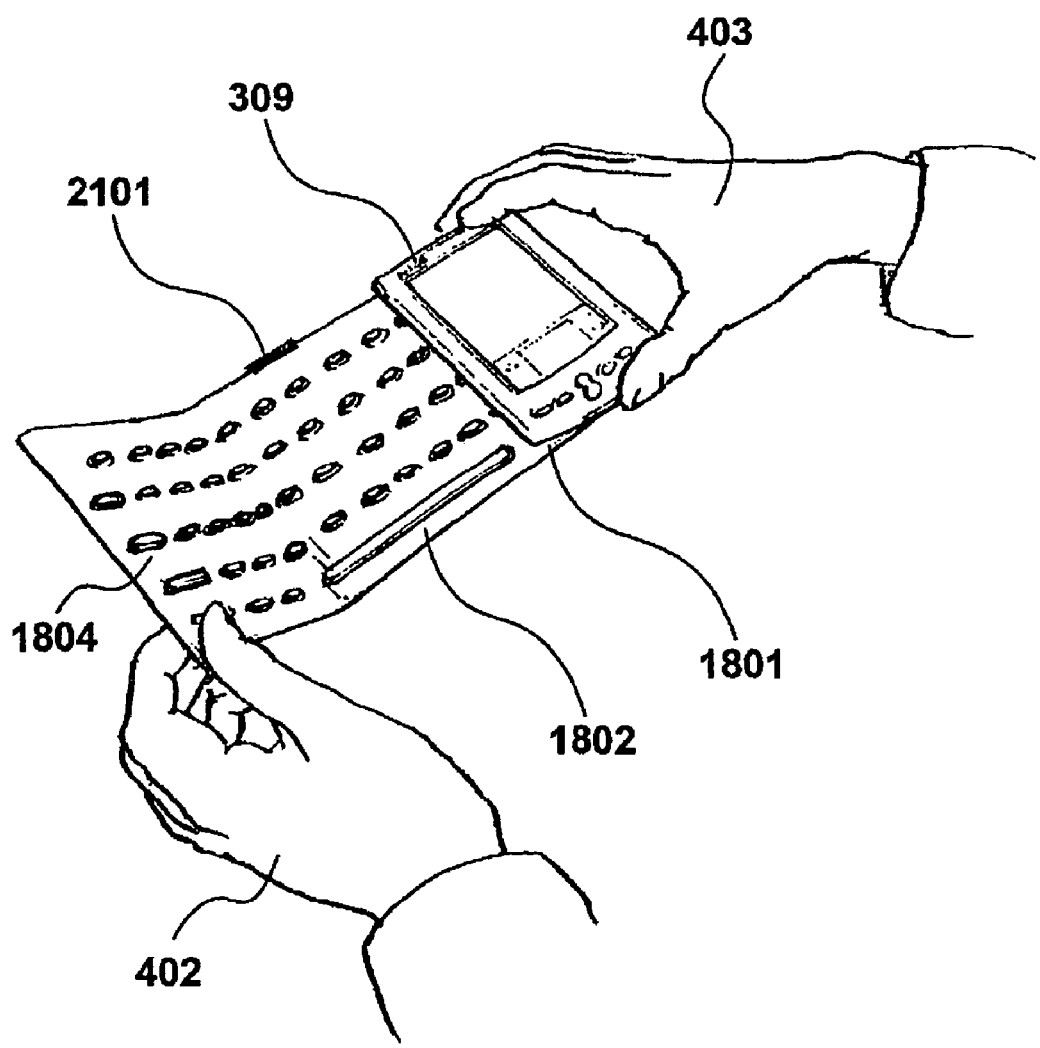
FIG. 21 shows the second embodiment of the invention in a transitional configuration.

Alternatively, if the operator should wish to use the fabric keyboard in conjunction with the hand-held processor device it will be necessary to re-configure the device into the operational configuration. To re-configure the device to the operational configuration, the front cover of the device 102 can be unfolded along the second bend 1806 as shown in FIG. 21 to reveal the keys of the keyboard that reside on the internal surfaces of the central and second lateral portions. In this transitional state, as shown in FIG. 21, the central portion 1802 and the second lateral portion 1804 are unfolded and ready for use as a keyboard. The first lateral portion 1801 remains concealed behind the hand-held processor device 309.

To complete the reconfiguration of the device to the operational configuration, the hand-held processor device 309, as shown in FIG. 21 is removed from the first lateral portion, where it is releasably secured, and connected to the interface circuit connection port 2101 shown centrally located on the upper edge of the central portion 1802.

FIG. 22

Figure 22:
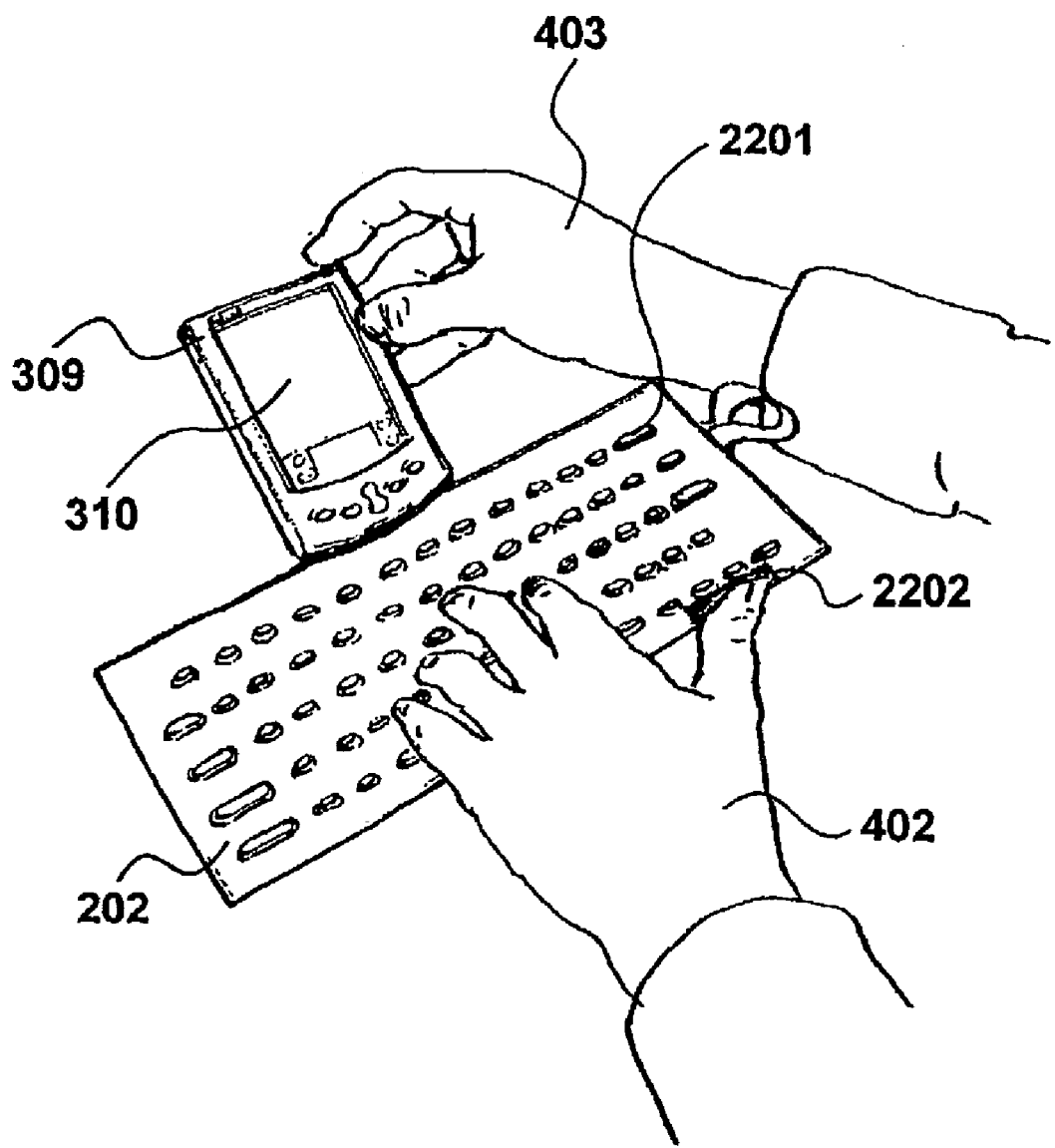
FIG. 22 shows the second embodiment in the operational configuration.

The device is shown in the operational configuration in FIG. 22. In this configuration, the entire keyboard surface (i.e. the first lateral portion 1801, the central portion 1802 and the second lateral portion 1804) are accessible and accordingly, an operator may press any of the keys present on the keyboard surface. Loop strips 2201 and 2202 are shown located on the internal surface of the first portion of the keyboard 202. These loop strips are configured to engage with corresponding hook strips attached to the rear surface of the hand-held processor device 309 to releasably secure the processor device to the keyboard as shown in the previous FIGS. 18 to 21.

In the operational configuration, the hand-held processor device 309 is supported on a surface in a central and elevated position relative to the keyboard 202. The processor device 309 is supported in the elevated position by a support leg (not shown). The keyboard 202 is connected to the hand-held processor device via the interface circuit and the serial input ports of the hand-held processor device 309 as previously described. The operator, therefore, can press keys on the surface of the keyboard 202 to input the corresponding alpha numerical data into the hand-held processor device 309 and view the data entries on the screen 310.

When the operator has finished using the keyboard 202 the hand-held processor device can be disconnected from the keyboard and reattached via its rear surface to the first lateral portion 1801. The processor device 309 is secured into this position by the engagement between hook strips on the rear of the processor device 309 and the corresponding loop strips 2201 and 2202 located on the surface of the fabric keyboard 202. The second lateral portion 1804 is then folded at 1806 to cover the central portion of the keyboard 1802. In this position, the device has been reconfigured into the intermediate position as described in reference to FIG. 20. The central portion 1802 is then folded over at 1805 to form the front cover of the hand-held processor device 309. The front and rear covers so formed of the device 102 are subsequently secured together in the wrapped configuration by the elastic strap 1803.

FIG. 23

Figure 23:
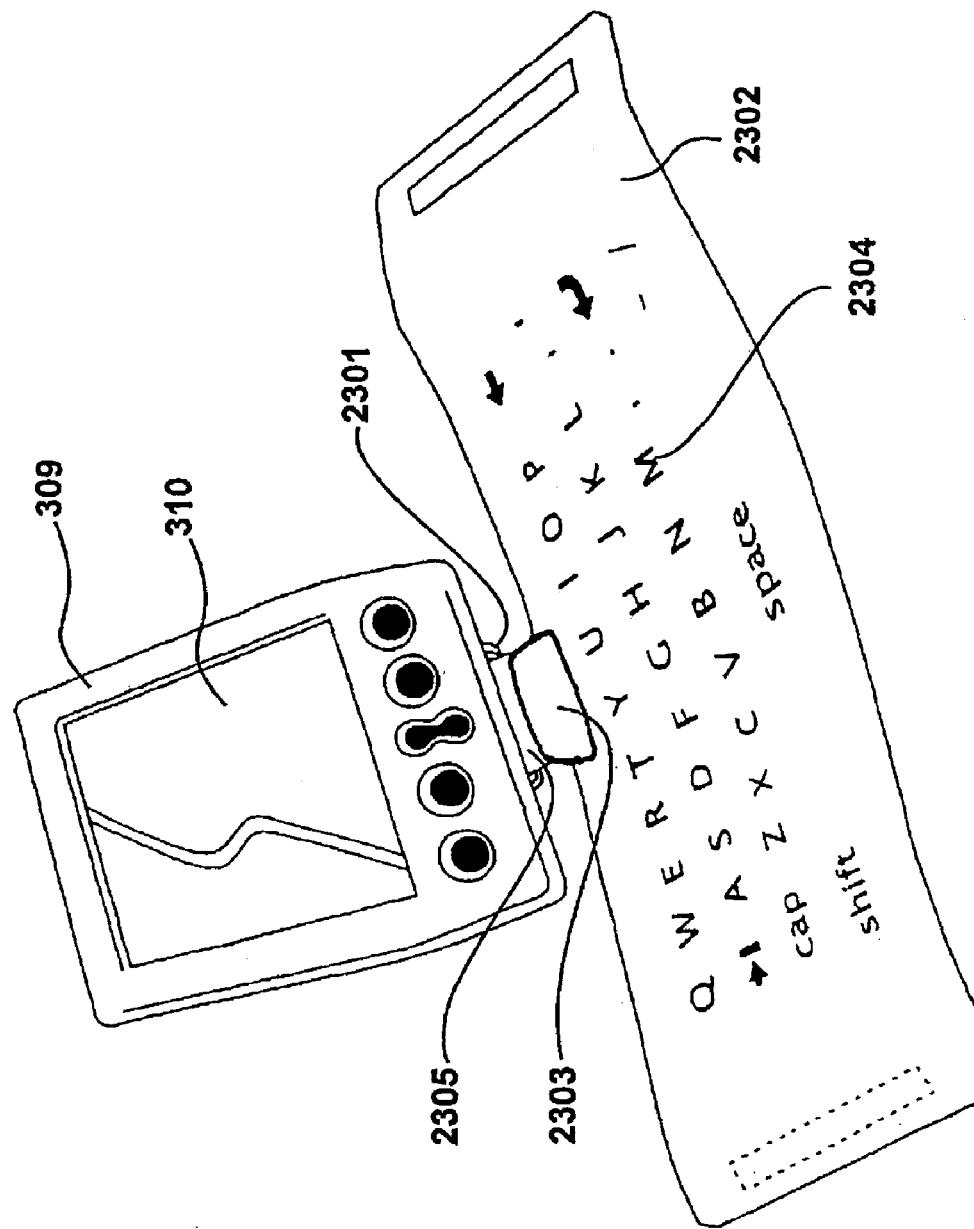
FIG. 23 shows a third embodiment of the present invention in the operational configuration.

A further embodiment of the present invention is shown in the operational configuration in FIG. 23. As described in reference to the previous two embodiments, the fabric keyboard 2302 shown in FIG. 23 is connected to the hand-held processor device 309 via the interface circuit 2303, flexible fabric cable 2305 and the serial interface provided on the rear bottom end 401 (not shown) of the hand-held processor. In this embodiment the hand-held processor 309 is a Palm~ III processor manufactured by Palm Inc. The connecting strip 2305 provides a mechanical connection between the keyboard and the hand-held processor. The interface circuit, as previously described, provides power to the fabric keyboard 2302 and determines outputs from the fabric keyboard in a manner described in reference to FIGS. 11 to 16. A slight modification to the operation of the keyboard is required given that power for the operation of the keyboard is derived from the hand-held processor which, in this embodiment provides 3.3 volts, with the previous embodiments operating on 3.7 to four volts derived from the Palm$^{RTM}$ Vx processor.

In the operational configuration, the alpha numeric characters of the keyboard 2302 are accessible to the operator and data input entries produced by pressing a key are displayed to the operator via the screen 310 of the hand-held processor 309.

The keyboard 2302 of the present embodiment differs from that of the previously described embodiments in that the silicone rubber moulded key registration device layer 904 is absent. Accordingly, the keys do not have any elevation from the keyboard surface in the embodiment shown in FIG. 23. This has the advantage that the keyboard 2302 is of reduced thickness to the keyboard 202 which allows for a more compact device in the wrapped configuration and less steric hindrance on bending, but has the disadvantage in that no tactile feedback occurs on depressing a key and some protective cushioning capacity may be lost by omitting the silicone rubber moulded key registration layer. Therefore, in an alternative embodiment the fabric keyboard 2302 comprises a silicone rubber moulded key registration layer such as the layer 904.

The application of a mechanical pressure to keyboard 2302 results in the identification of the position of the mechanical interaction by the interface circuit 2303 as previously described. In this embodiment, however, which uses a Palm~ III processor as the hand-held processor 309, the positional data is correlated with look-tables and related to a specific alpha numerical data entry in the PIC processor 1102. The character representation is then transmitted to the hand-held processor 309. Therefore, the look-up correlation is performed by the interface circuit 2303 rather than the hand-held processor 309.

In addition to identifying particular locations corresponding to key presses, it is also possible to identify gestures, such as the sweeping of a finger across a keyboard in a particular direction. Upon detecting a dynamic movement of this type, the interface circuit 2203 catches this and again converts this into a particular form of data that may be transferred to the hand-held processor 309. In the present embodiment, for example, a gesture of this type could be used to shift from lower case to upper case characters. Alternatively, with the keyboard connected to a device such as a mobile phone for example, a gesture movement could indicate to the mobile phone that a call is to be established, equivalent to pressing the send button on most commercially available mobile phones.

In addition to being used as a keyboard, the keyboard 2302 may also perform other functions, similar to those available through use of a mouse or a touch tablet etc. Under this mode of operation, instead of individual regions being identified, movements over the surface of the device are detected and conveyed as positional or vector information to the hand-held processor 309. A region within the device may be established allowing mode selection. Alternatively, a particular gesture movement, such as a vertical swipe, may be used to indicate a transfer between modes of operation.

FIG. 24

Figure 24:
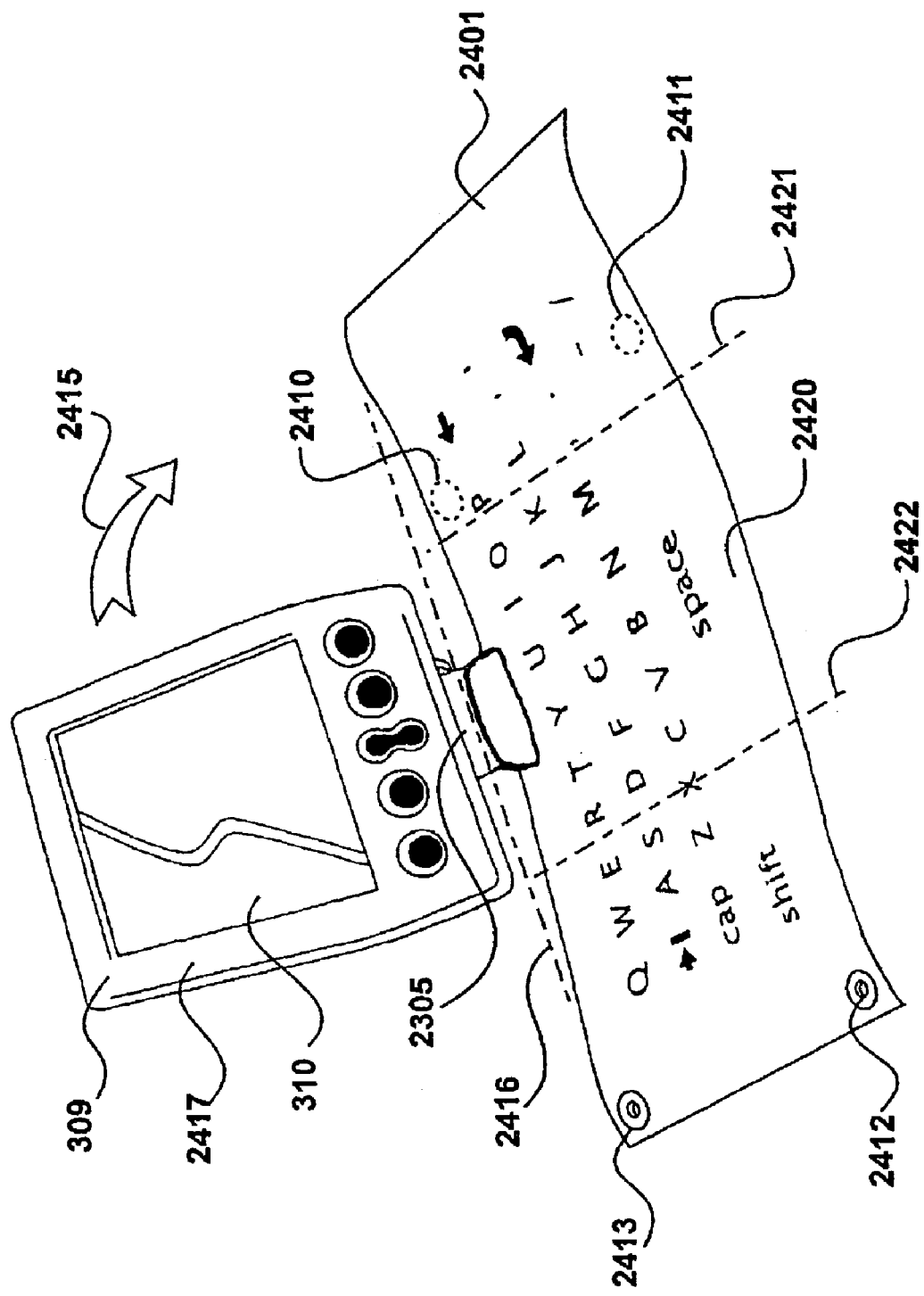
FIG. 24 shows a further embodiment of the device shown in FIG. 23 having a keyboard provided with an alternative securing means.

In FIG. 24, the hand-held processor 309 is shown connected to a keyboard 2401 of similar construction to keyboard 2302 but having an alternative means of securing the keyboard in the wrapped configuration. Whereas keyboard 2302 is provided with hook and loop fastening strips, keyboard 2401 has press-studs.

Figure 25:
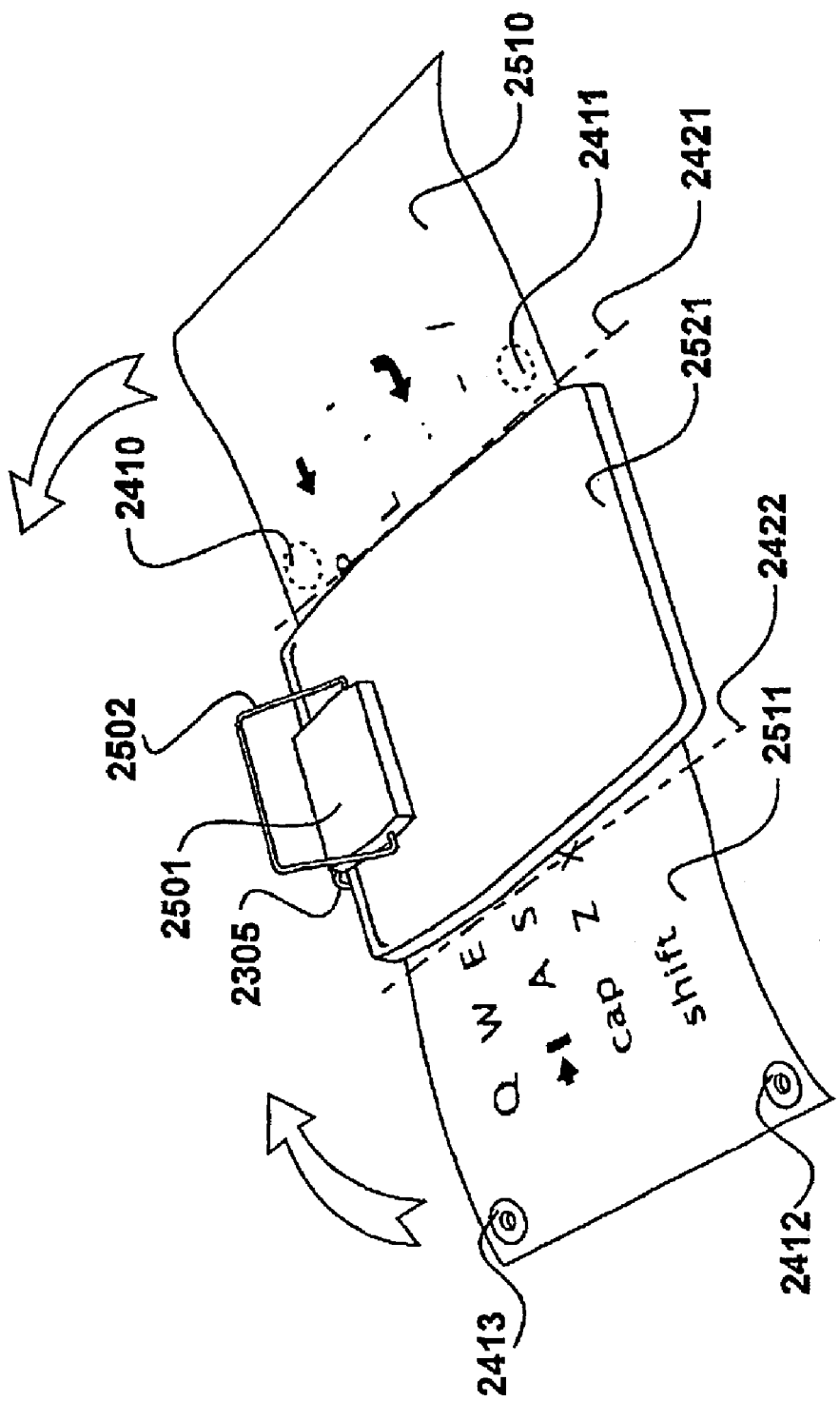
FIG. 25 shows the device of FIG. 24 in the intermediate configuration.
Figure 26:
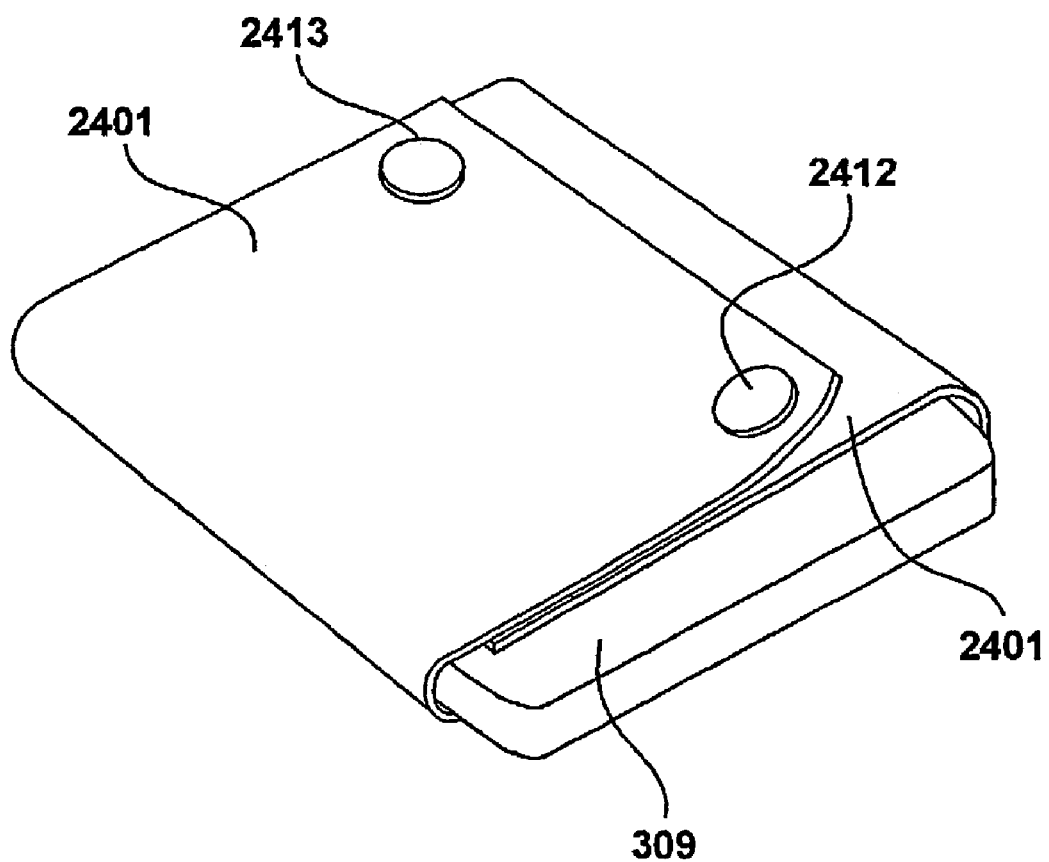
FIG. 26 shows the device shown in FIGS. 24 and 25 in the wrapped configuration.

The method of wrapping the hand-held processor 309 from the operational configuration to the wrapped configuration in the present embodiment is in FIGS. 24, 25 and 26. In FIG. 24, the hand-held processor 309 and keyboard 2401 are shown mutually arranged such that a user may type on the keyboard while observing its screen display 310 which is centrally located relative to the keyboard 2401 and supported in an elevated position relative to the plane of the keyboard. However, when the use of the processing device 309 is no longer required, it is wrapped up in the fabric keyboard 2401, to form a protective cover for the hand-held processor 309. The keyboard is provided with press-studs 2410 to 2413 which are fastened to secure the keyboard in place around the hand-held processor 309.

The hand-held processor 309 is wrapped in the keyboard by firstly bending the flexible fabric cable 2305 such that the hand-held processor 309 is rotated forward as indicated by arrow 2415, around a first axis indicated by dashed line 2416. In the present embodiment, flexible fabric cable 2305, is bent such that the front face 2417 of the hand-held processor 309 lays against a central portion 2420 of the keyboard's upper surface, as shown in FIG. 25. In an alternative embodiment, the flexible fabric cable is replaced by a hinged mechanism that allows similar folding while providing the electrical data connection between the keyboard 2401 and the processing device 309.

FIGS. 25 and 26

Therefore, FIG. 25 shows the fabric keyboard 2401 and the processing device 309 after the first stage of the wrapping process in the intermediate position, and it also shows the connecting strip connected to the hand-held processor 309 by a suitable connector 2501. A leg 2502 is provided which is connected by means of a hinge to the connector 2501. The leg is shown in its operating position and it is used to provide a stand for the hand-held processor 309 to allow the LCD screen to be viewed more easily.

In order to reconfigure the device into the wrapped configuration, the leg 2502 is folded down, so that it is substantially parallel to the rear of the hand-held processor. A first lateral portion of the keyboard 2510 is then bent around a second axis indicated by dashed line 2421, and at right angles to axis 2416, so that the first lateral portion 2510 of the keyboard lays against the rear surface 2521 of the hand-held processor 309. The keyboard is then folded around a third axis 2422, substantially parallel to the second axis 2421, so that a second lateral portion of the keyboard 2511 lays against the rightmost part of the rear surface 2521 of the hand-held processor 309. Thus hand-held processor 309 is wrapped in the keyboard as shown in FIG. 26, and the press-studs 2412 and 2413 are then fastened to 2411 and 2410 to hold the keyboard in place.

Thus the keyboard 2401 may be arranged in an operational configuration as shown in FIG. 24 and may be reconfigured into a wrapped configurations as shown in FIG. 26, by rotating the hand-held processor 309 by folding the connecting means about a first axis 2416, and then folding the keyboard about a second axis 2421 and a third axis 2422 which are non-parallel with the first axis.

FIG. 27

Figure 27:
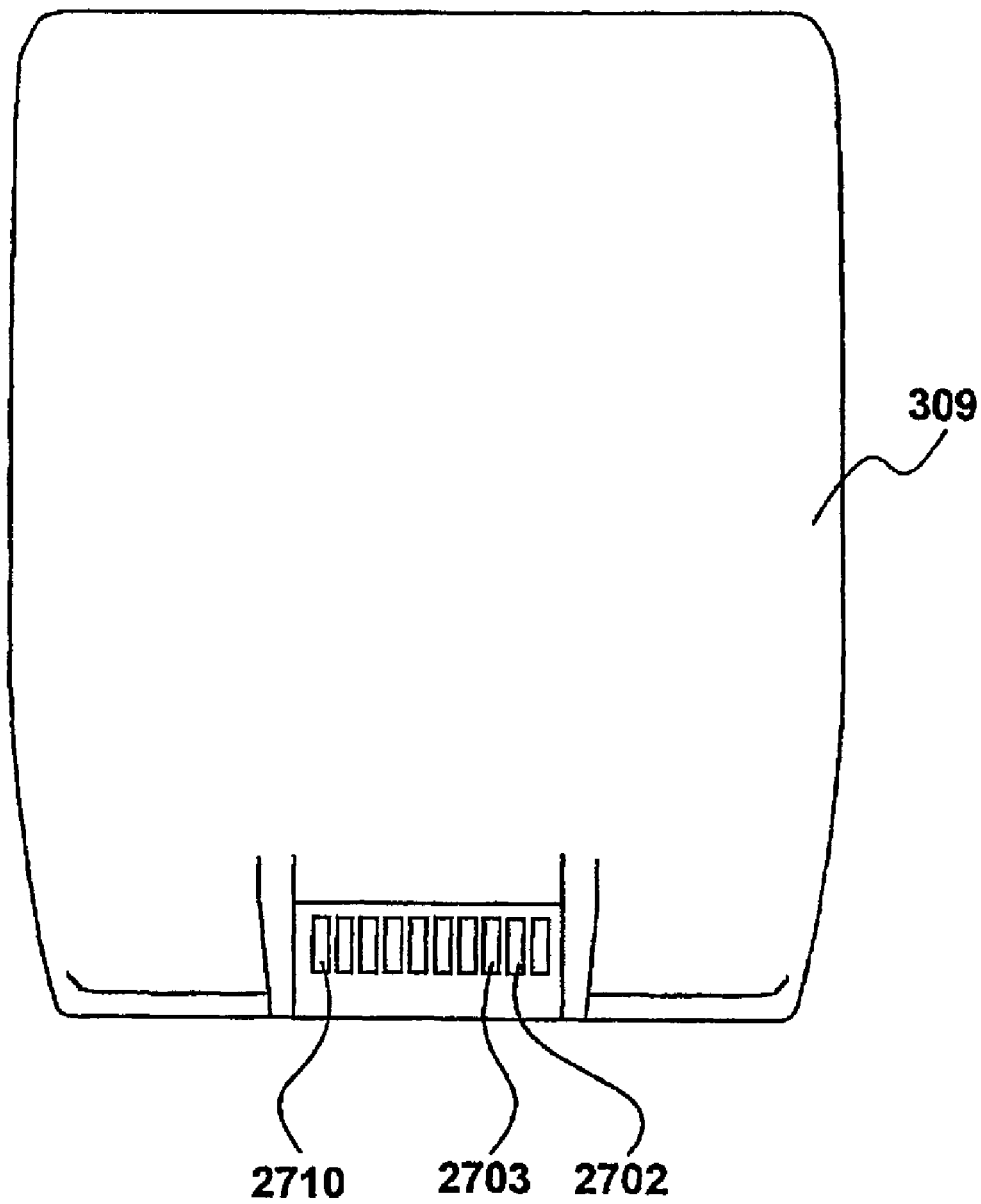
FIG. 27 is a rear view of a hand-held processor detailing the serial interface connection pins.

A rear view of hand-held processor 309 (a Palm$^{RTM}$ III processor manufactured by Palm Inc.) is shown in FIG. 27. The rear of the hand-held processor 309 includes ten electrical connections referred to as pins, such as pins 2702, 2703 and 2710. Pin 2702 provides 3.3 volts to the interface circuit through a three hundred and thirty ohm resistor within the hand-held processor. From the hand-held processor perspective, pin 2703 is the receive data connection, therefore data from interface circuit 2303 is supplied to this pin. Signal ground is provided by pin 2710 and for this particular application the remaining pins are not used.

FIG. 28

Figure 28:
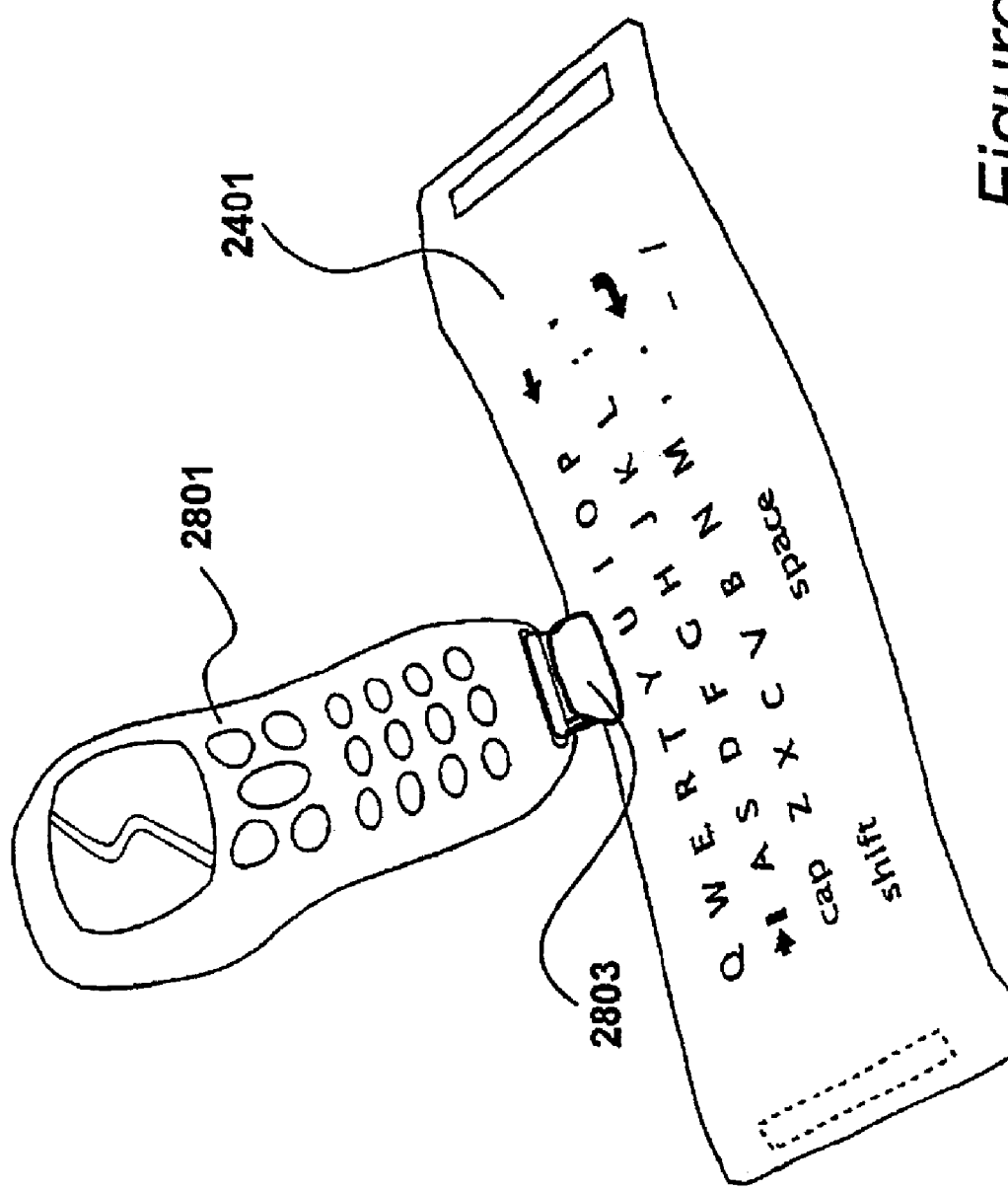
FIG. 28 shows the keyboard 2401 shown in FIG. 24 connected to a mobile phone.

The keyboard can be used with any portable equipment where data entry is required or is considered desirable. A further example is shown in FIG. 28 in which a flexible keyboard 2401, is attached to a mobile cellular telephone 2801 via a suitable interface 2803. Typically, communications interfaces of mobile cellular telephones are responsive to AT commands as is well known in the art. Particular implementation of an interface device 2803 will, however, require modification in order to facilitate connection to a particular mobile phone variety and information may be required from a mobile telephone company in order to fully secure an appropriate link without invalidating warranties.

Increasingly, mobile telephones similar to telephone 2801 are being used for the transmission of text messages, that may be achieved using the second generation GSM standard via the SMS procedure. Text communication is further enhanced by WAP technologies and applications for third generation mobile telephones. Thus, a keyboard of this type becomes particularly attractive when the telephone is being used for e-mail or Web browsing. Thus, a relatively small telephone can be given functionality substantially similar to that provided by more sophisticated models, such as the Nokia Communicator 9000.

FIG. 29

Figure 29:
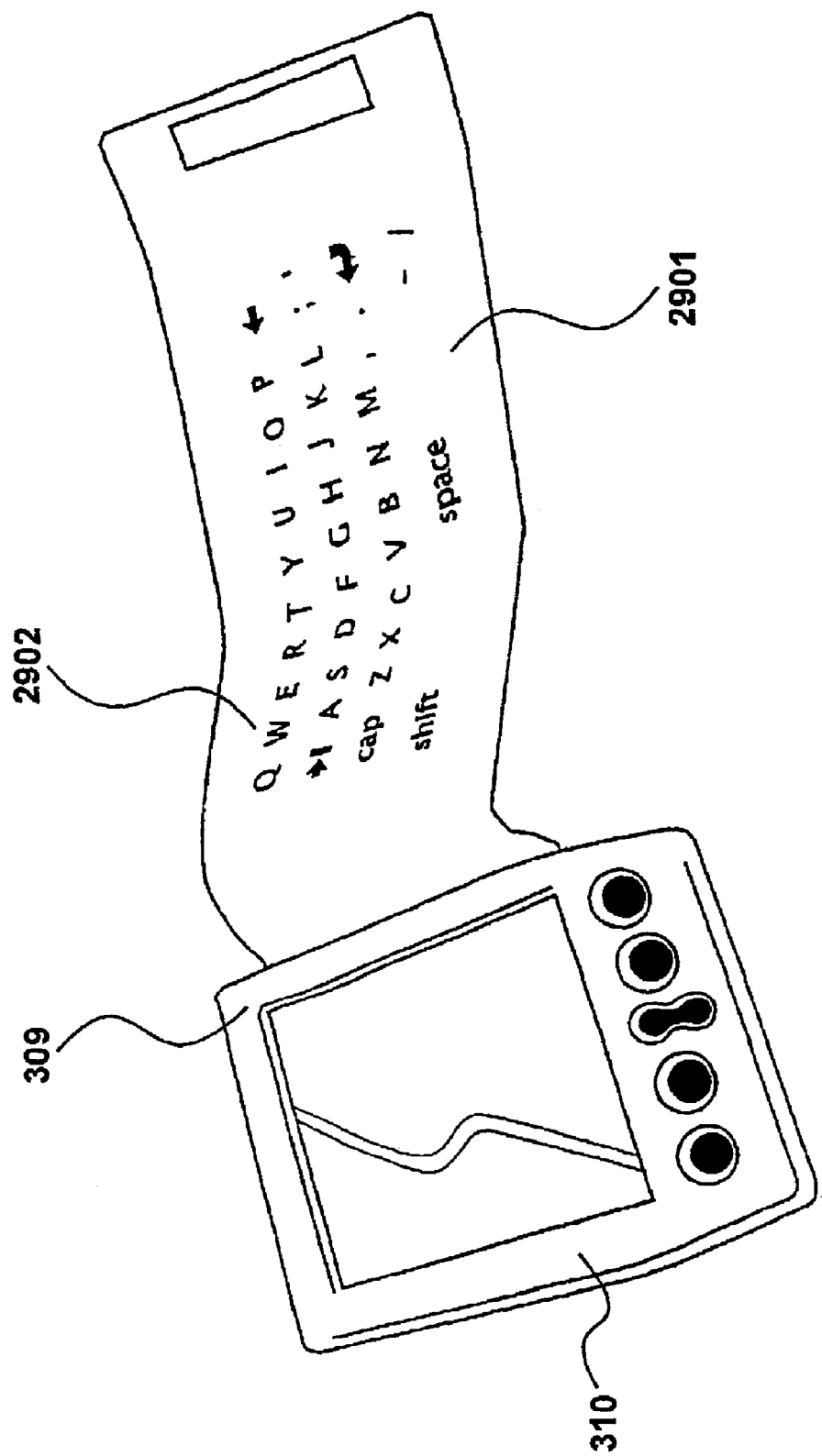
FIG. 29 shows a further embodiment of the present invention in the operational configuration.

FIG. 29 shows a further embodiment of the present invention in the operational configuration. The keyboard 2901 is identical in structure to keyboard 2401 previously described in reference to FIG. 24. As before, the surface of the keyboard is graphically divided into a plurality of regions each of which is associated with a particular letter, such as the letter W indicated at 2902, numeral or similar keyboard button function. The keyboard 2901 is secured to a hand-held electronic processing device 309 which, in this example, is a Palm IIIe manufactured by Palm Inc. The keyboard is secured to the hand-held device 309 by clamping a short portion of the keyboard between the two halves of the case of the hand-held device.

An advantage of the arrangement shown in FIG. 29 is that the keyboard remains permanently connected to the electronic processing device and is therefore always available for an operator to use when making operations where it is preferable for a manual keyboard to be available. In addition, whilst being transported, the keyboard adds very little in terms of bulk and is therefore permanently provided without incurring undesirable additional weight and bulk. Furthermore, during transportation the sheets forming keyboard 2901 are arranged to be wrapped around the device 309 thereby minimising the additional bulk associated with the device 309 while at the same time providing a protective cover.

Figure 30:
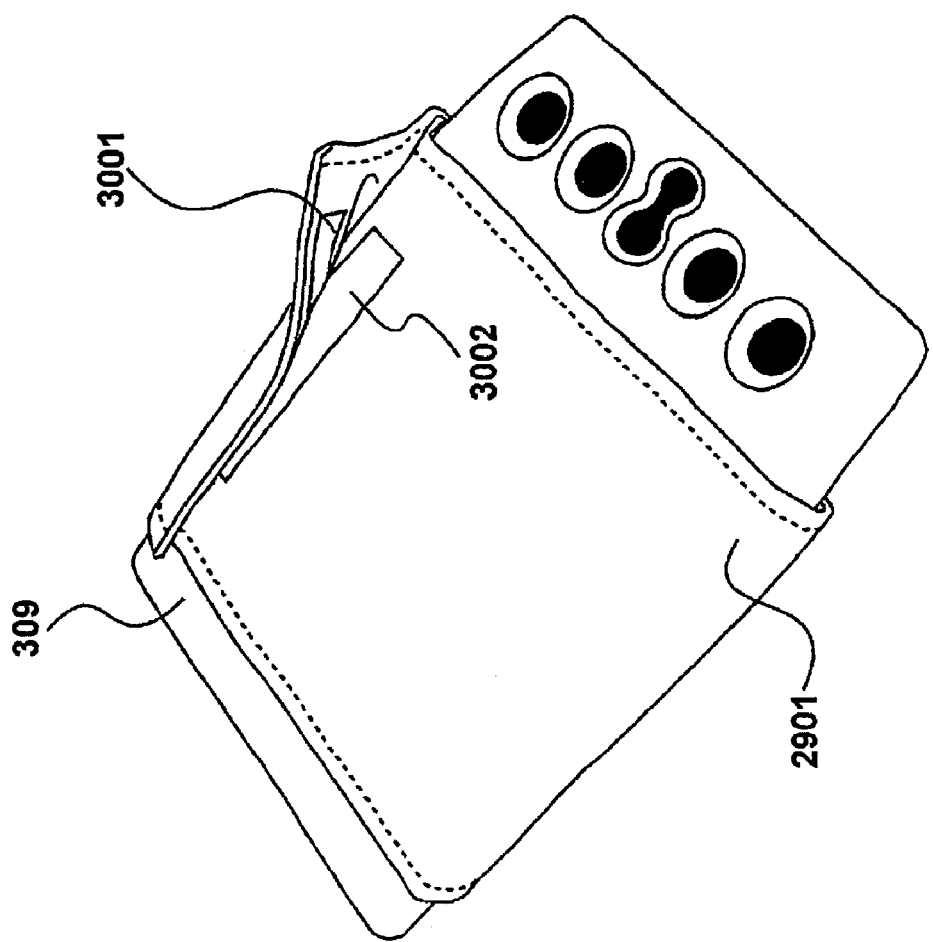
FIG. 30 shows the embodiment shown in FIG. 28 in the wrapped configuration.

In the operational configuration shown in FIG. 29 an operator can access all the keys on the surface of the fabric keyboard. When not in use, however, such as during transportation, the fabric keyboard 2901 can be reconfigured into the wrapped configuration as shown in FIG. 30. The fabric keyboard is first extended over the surface of the hand-held processor 309, around a first edge of the device, across the rear of the device and around the opposing second edge of the device.

FIG. 30

The fabric sheets are held firmly in place by means of a hoop and loop fastener system made up of components 3001 and 3002.

FIG. 31

Figure 31:
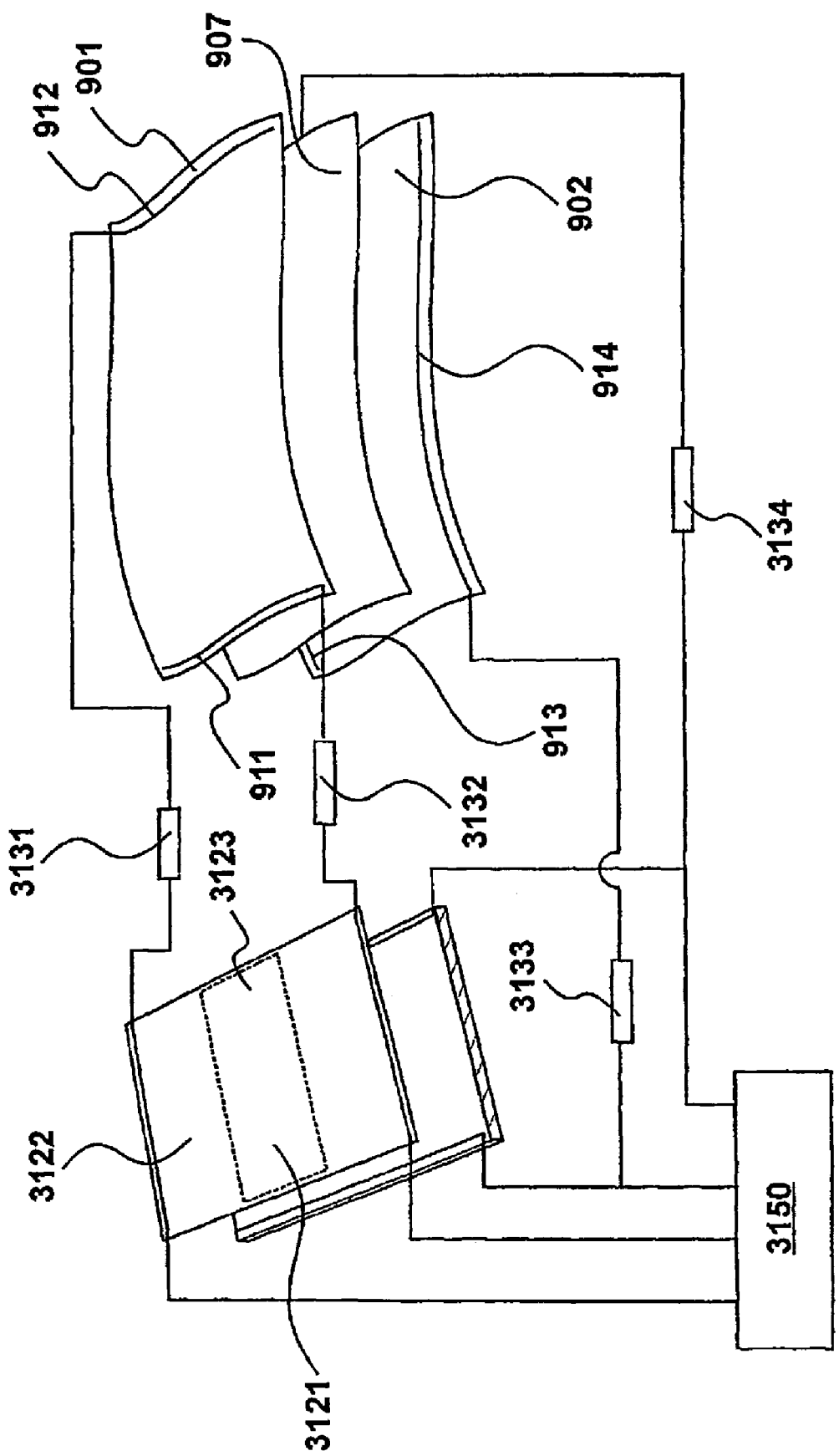
FIG. 31 details the wiring formed between the hand-held processor and the fabric keyboard of the embodiment shown in FIGS. 29 and 30.

The electrical connections formed between the fabric keyboard 2901 and the processing device 309 are shown in FIG. 31. For the purpose of illustration, only the first electrically conductive layers 901 and 902, and the central conductive layer 907 of the fabric keyboard have been shown. It must be appreciated however, that the device advantageously comprises nine layers as previously described in reference to FIG. 23 or, in an alternative embodiment, comprises the ten layers described in reference to FIG. 9.

The first electrically conductive layer 901 has first and second conductive tracks 911 and 912 attached thereto as previously described and the second electrically conductive layer 902 has a third conductive track 913 and a fourth conductive track 914 attached thereto, again as previously described. Central conductive layer 907 has previously been described in reference to FIG. 9. The position of this mechanical interaction is detected as previously described in FIGS. 12 to 17.

The process of measuring X and Y co-ordinates of a mechanical interaction on the keyboard surface is a two-part operation and is substantially similar to that performed within the hand-held processor device 309. Consequently, this provides a relatively straightforward manner for interfacing the keyboard 2901 with the processing device 309.

The display 310 includes a glass sheet 3121 having an electrically conductive coating applied to its upper surface. This is then held parallel to a transparent plastic sheet 3122 having an electrically conductive coating on its lower surface. The two sheets 3121 and 3122 are held very close together and, as such, a minimal mechanical pressure applied to upper sheet 3122 results in electrical contact being made between the two sheets. The position of this mechanical contact is then determined by using a process substantially similar to that performed in order to determine the position of contact on the fabric keyboard 2901. Consequently, in the configuration shown in FIG. 31, the electronics provided for determining the position of a mechanical interaction upon the actual hand-held processor display 310 is exploited to provide a similar mechanical detection process for the fabric keyboard 2901. The two are therefore connected in parallel such that the electronics of the hand-held processor 309 operate as normal receiving signals via the fabric keyboard 2901 that are substantially similar to signals received from the internal display 310.

The resistance of conductive sheet 901 in the X direction, between conductive tracks 911 and 912, is typically 5K57 Ohms. Similarly, the resistance in the Y direction of sheet 902, between conductive tracks 913 and 914 is typically 11(36 Ohms. In the particular software used to display a keyboard on hand-held processor display 310, the on screen keyboard is positioned substantially at the centre of the display, as indicated by dotted line 3123. Consequently, signals received from the fabric keyboard 2901 require off-sets in order for the regions representing alpha numeric characters to map onto the position of similar alpha numeric characters displayed in region 3123. This is achieved by the provision of additional resistors 3131, 3132, 3133 and 3134. Typically, for sheet resistances previously described resistors 3131 and 3132 have a resistance of 2K Ohms and resistors 3133 and 3134 have a resistance of two hundred and twenty Ohms. Additional processing circuitry of the hand-held processor, that is not modified in any way, is represented generally by box 3150.

FIG. 32

Figure 32:
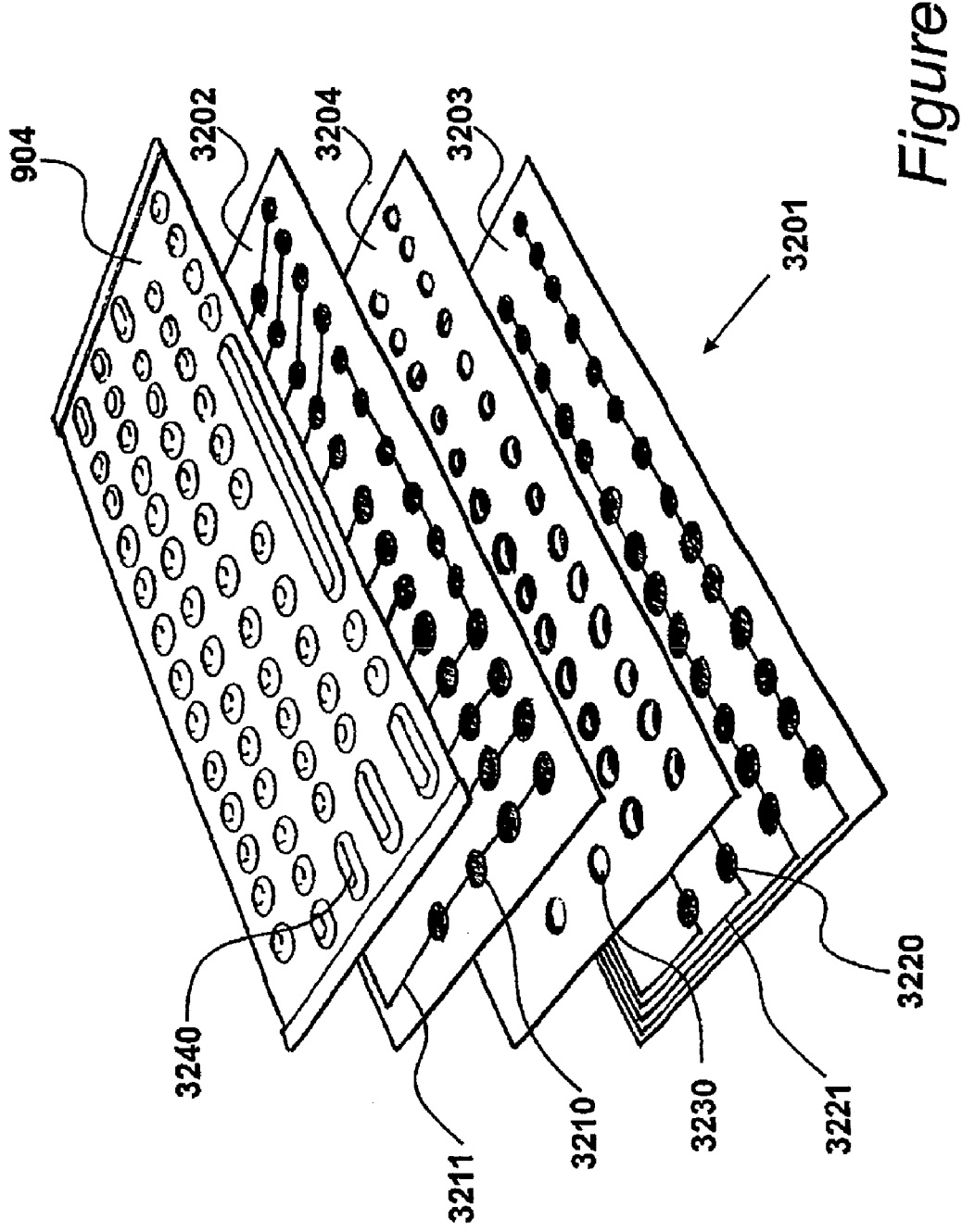
FIG. 32 is an exploded view of an alternative membrane keyboard embodiment of the manually operable input apparatus.

An alternative embodiment to the fabric keyboard 202, 2401 and 2801, as previously described, is shown in FIG. 32. In this embodiment, the keyboard 3201 is a membrane keyboard and is shown in an exploded perspective view in FIG. 32 to illustrate the constituent layers.

The uppermost layer is a silicone rubber moulded layer 904, identical to that previously described in reference to FIG. 9. This layer is laminated on the upper surface with a durable fabric layer such as layer 903 (described in reference to FIG. 9), onto which graphical icons corresponding to the individual keys are printed. In an alternative embodiment, the uppermost layer is laminated with a durable flexible plastic film, such as the polyester or polyvinyl chloride film, onto which the graphics corresponding to each key are printed.

The membrane keyboard 3201 comprises a first electrically conductive membrane film 3202 and a second electrically conductive membrane film 3203. In addition, a spacing membrane layer 3204 is positioned in between the first electrically conductive membrane layer 3202 and the second electrically conductive membrane layer 3203.

The first electrically conductive membrane layer 3202 is a film of Mylar$^{RTM}$ (polyethylene terephthalate). Onto the underside of the film 3202 carbon electrodes (formed from silver-loaded ink), such as 3210, are printed forming the conductivity of the first electrically conductive membrane. The electrodes are connected to an interface circuit which supplies voltages to the electrodes, such as 3210, via conductive tracks, such as 3211. Each electrode is specifically aligned so as to correspond with a key registration device on the layer 904. For example, the electrode 3210 corresponds to the centre of the 'CAPS LOCK' key 3240.

The second electrically conductive membrane layer 3203 is also composed of Mylar$^{RTM}$ membrane having silver-loaded ink electrodes such as 3220 printed onto the upper surface which form the electrical conductivity of the second electrically conductive membrane layer. Each of the electrodes printed onto the upper surface of layer 3203 is aligned with a corresponding electrode on layer 3202 and a corresponding key registration device on layer 904. For example, electrode 3220 on layer 3203 is specifically aligned with electrode 3210 on layer 3202 and the 'CAPS LOCK' key 3240 on layer 904.

A separator layer 3204 is a non-conductive membrane sheet of Mylar$^{RTM}$ with holes, such as 3230, located to coincide with the electrodes printed on to the surfaces of layers 3202 and 3203. For example, the hole 3230 is specifically aligned with the electrode 3210 on layer 3202 and the electrode 3220 on layer 3203.

The separator layer 3204 prevents an electrical contact occurring between the electrodes of layers 3202 and 3203 unless a mechanical interaction has occurred by pressing a key on layer 904. For example, the 'CAPS LOCK' key 3240, when pressed, causes the compression of the electrode 3210 towards the electrode 3220 through the hole 3230 in the separator layer 3204. In principal the key registration device 3240 is functioning identically to the key registration device 303 as described in reference to FIGS. 17A and 17B.

Accordingly, if a voltage is supplied to the electrode 3210 via the conductive track 3211, a press of the 'CAPS LOCK' key will form an electrical contact between the electrode 3210 of layer 3202 and the electrode 3220 of layer 3203. Therefore, a voltage output is detectable in the conductive track 3221 on layer 3203. As the depression of the 'CAPS LOCK' key is the only key that would produce a voltage output in conductive track 3221 when a voltage has been applied to the conductive track 3211, then, by detecting this voltage output, the interface circuit is able to correlate the output with the corresponding electrical connections formed. This data is either correlated with look-up tables in the interface circuit to assign the correlating 'CAPS LOCK' function output with the key press or the look-up table correlation is performed in the hand-held processor following an output of the connections formed and the output detected.

In an alternative embodiment, the membrane layers 3202, 3203 and 3204 are made of an alternative plastics material such as polyester or polyvinyl chloride.

FIG. 33

Figure 33:
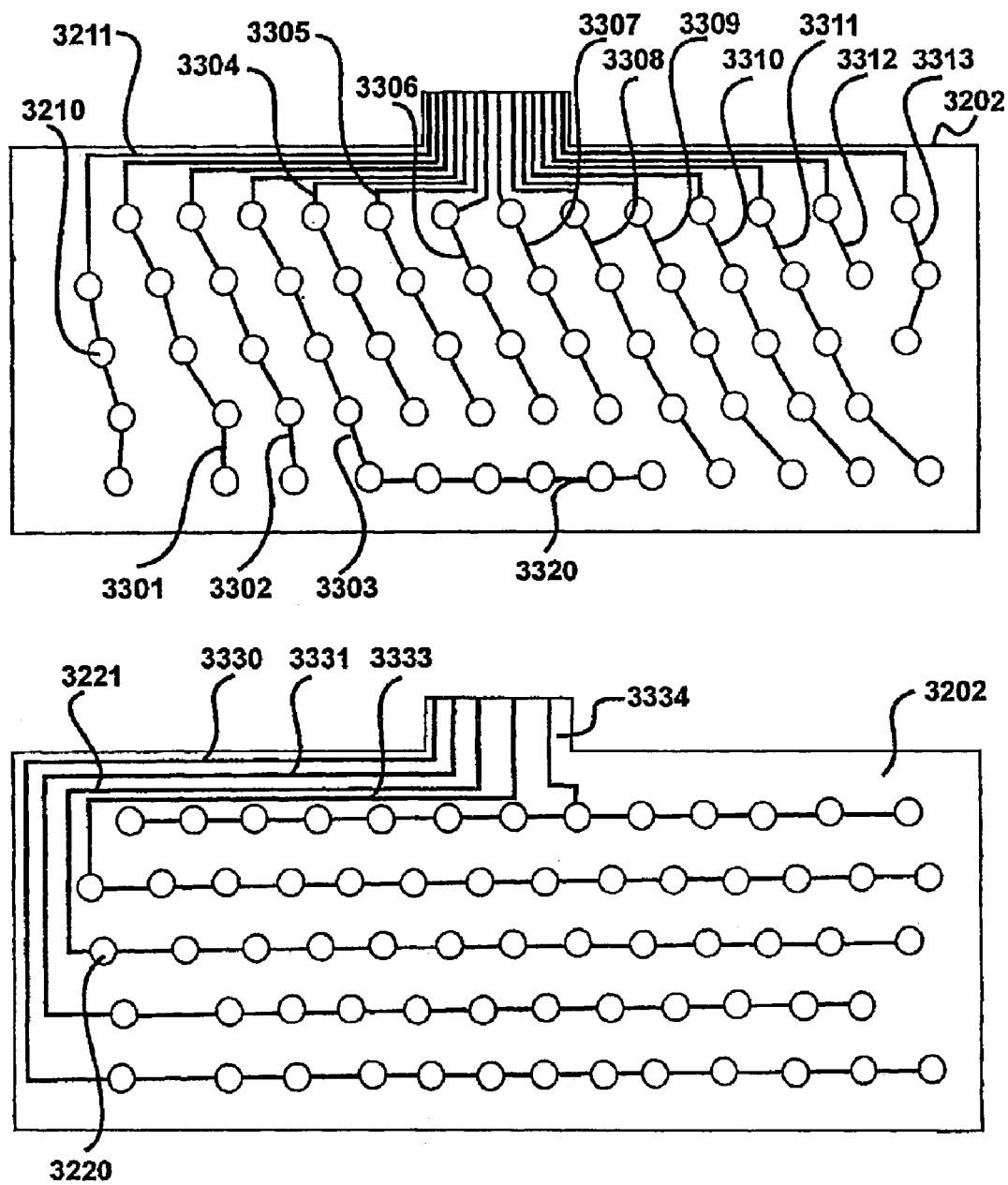
FIG. 33 is a detailed view of the electrically conductive membrane layers 3202 and 3203 shown in FIG. 32.

The electrically conductive membrane layer 3202 is shown in more detail in FIG. 33. The layer 3202 has a conductive electrode, such as 3210, for each key of the keyboard and the elongate space bar, in this embodiment, has six corresponding electrodes as indicated at 3320. Voltages are applied to the electrodes via conductive track 3211 and 3301 to 3313 which are generally arranged to define fourteen columns respectively. The conductive tracks 3211 and 3301 to 3313 extend to form a connection with the interface circuit (not shown). The interface circuit can form a connection independently with each conductive track as will be described later in reference to FIG. 34.

The second electrically conductive membrane layer 3201 is also shown in FIG. 33. Each conductive electrode printed on the surface of membrane layer 3203, such as 3220, is connected by one of five conductive tracks 3221 and 3330 to 3334. In contrast to the first electrically conductive layer 3202, the conductive tracks of the second membrane layer 3203 effectively connects the electrodes to define a series of five rows that extend near perpendicularly to the columns defined by the conductive tracks on layer 3202. Accordingly, each key, when pressed, will only produce an output in a specific row following the application of a voltage to a specific column defined on layer 3202. For example, if a voltage is supplied to conductive track 3303 which extends to form connections to the six electrodes corresponding to the space bar key as indicated at 3320, and the space bar key is depressed, a voltage output will be detectable in conductive track 3330 of layer 3203. The depression of the space bar key is the only key that will produce an output in conductive track 3330 when a voltage is supplied to the conductive track 3303.

There are many alternative configurations that the electrodes and conductive tracks may take to essentially achieve the same function to that shown in FIG. 33. In one such example of an alternative embodiment, the conductive rows and columns are effectively printed onto the same membrane layer such that at a given position corresponding to a key registration device the printed electrodes of a specific row and column terminate so as to provide an open circuit with electrodes adjacent to each other in the area of a key. In this embodiment however, attached to the underside of each key registration device is a 'pill' of conductive material such as carbon which, when the key is depressed, contacts and bridges the gap between the respective column and row terminal to form a closed circuit. In a similar manner to that described in reference to FIGS. 31 and 32, the detection of an output voltage in a particular row in response to a voltage supplied to a particular column will be indicative of a specific key press.

FIG. 34

Figure 34:
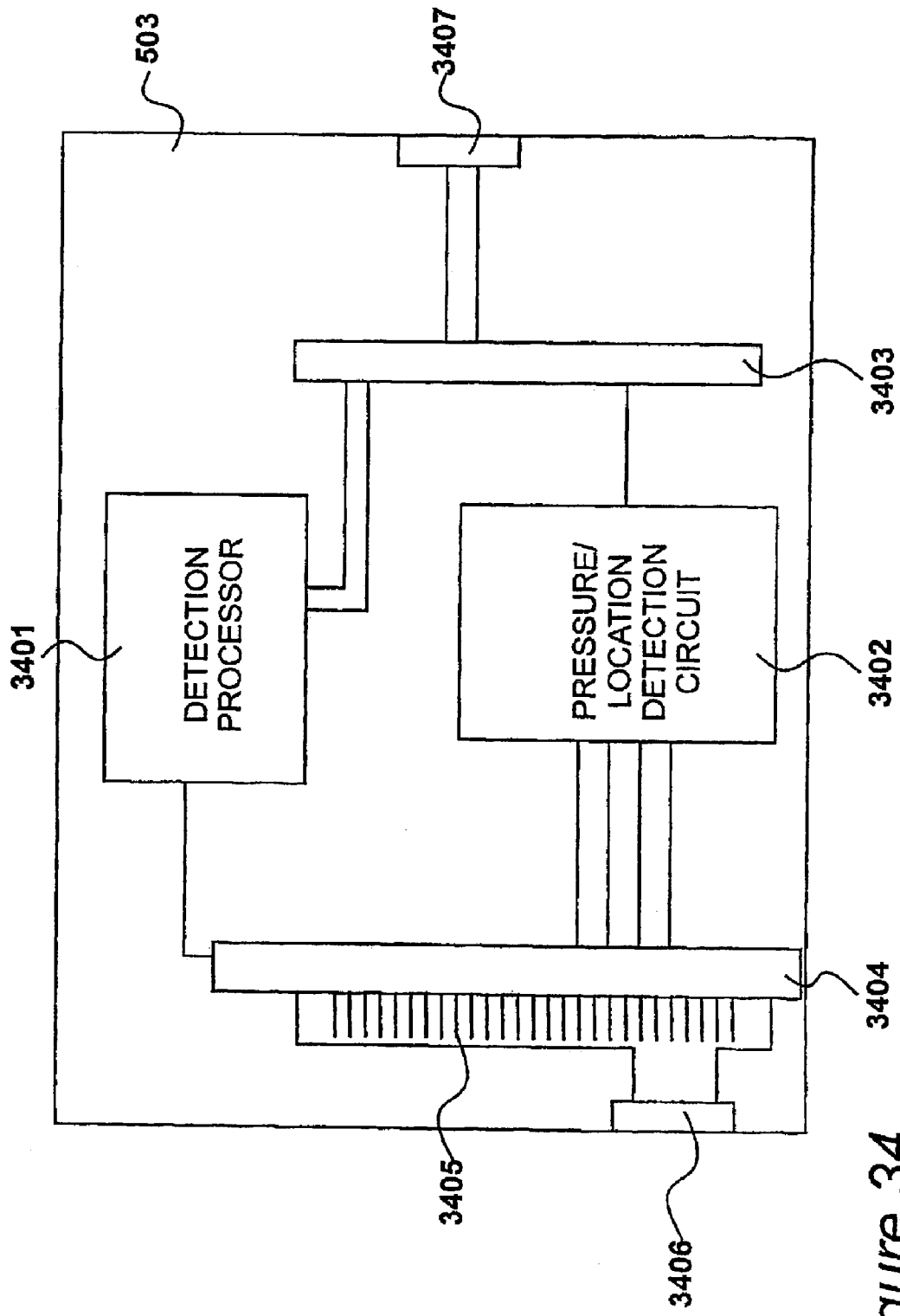
FIG. 34 details the modified interface circuitry for the operation of the membrane keyboard shown in FIGS. 31 and 32.

In order to enable the detection of a key press within an area of the keyboard, the interface circuit is arranged as shown in FIG. 34. The interface device includes a detection processor 3401, a pressure/location detection circuit 3402, a switching circuit 3403, a multiplex switch 3404 having electrical connection inputs elements 3405, an input socket 3406 and an output socket 3407 provided to allow connection to a hand-held device 309.

Each of the five conductive tracks that define five rows ~on membrane layer 3303 has an individual connection formed thereto and each of the fourteen conductive tracks that define columns of membrane layer 3302 has a connection formed thereto. Consequently there are nineteen connections formed between the interface circuit and the keyboard. The wires corresponding to each connection are fed individually to the input elements 3405 of multiplex switching circuit 3404.

If a key is pressed on the keyboard, the interface circuit provides an output identifying the location of a mechanical interaction. Voltages are applied to the keyboard through the pressure/location detection circuit 3402 which is essentially the same as the circuit shown in FIG. 11. The circuit shown in FIG. 11 forms four connections which in the interface circuit of the present embodiment are connected to multiplex switch 3404. In this embodiment, only two connections of the circuit shown in FIG. 11 are utilised. For example, voltages are applied to the conductive tracks of layer 3302 via connection 1104 and connection 1107 is connected to the conductive tracks of layer 3303 to detect any output voltages. The precise arrangement of the connections formed at any given time is determined by the multiplex switch, under the control of the detection processor. In a first mode of operation, the multiplex switch conducts a sequential scan of each row following the application of a voltage to each conductive column on layer 3302.

If an output is detected via connector 1107 in response to a key press, the pressure location detection circuit produces an output which is sent via the switching circuit 3405 to the detection processor 3401 where the output is correlated with the precise connection formed and positional information corresponding to the connections formed and the output received are sent to the hand-held processor via the switching circuit 3405 and the output socket 3407. In the present embodiment, such data is correlated with look-up tables to determine the corresponding alpha numerical or function input to which the key pressed relates.

In an alternative embodiment, to reduce the number of operations required to determine which key has been pressed and hence increase the speed with which a key press is detected, the multiplex switch 3404, in an initial state under the control of the detection processor 3401, connects the pressure/location detection circuit 3402 to all five conductive tracks on layer 3203 and a second connection to all fourteen conductive tracks on layer 3202. A total of two connections to the pressure location detection circuit 3402 are made. If, on viewing these terminals, an open circuit is present, no mechanical interaction has occurred on the alpha-numeric keyboard. Alternatively, if a closed circuit is identified, this indicates the presence of a mechanical interaction and an output to this effect is supplied to switching circuit 3403 which in turn conveys this information to the detection processor 3401 and to output socket 3407.

On detection of a mechanical interaction, the multiplex switch 3404 under the control of detection processor 3401, maintains the connection of the pressure/location detection circuit 3402 to layer 3202, and a single connection is made from the pressure/location detection circuit 3203 to the leftmost seven of the conductive tracks 3211 and 3301 to 3306 of layer 3202. Again the pressure/location detection circuit 3402 detects the presence of a closed or open circuit; a closed circuit indicating one or more key presses in the leftmost half of the alpha-numeric keyboard. An output indicative of an open or closed circuit is supplied to the switching circuit 3403 which in turn conveys this information to the detection processor 3401 and to output socket 3407.

The multiplex switching circuit is then commanded by the detection processor to disconnect the connection to the seven leftmost conductive tracks of layer 3202 and make connections from the pressure/location detection circuit 3402 to the remaining seven conductive 3307 to 3313 respectively. Again an open or closed circuit is detected and the information relayed to the detection circuit 3401. A closed circuit at this stage indicates one or more key presses in the rightmost half of the QWERTY keyboard outline.

The connections to the pressure/location detection circuit 3402 are maintained by the detection processor while the pressure location detection circuit provides an output indicative of a mechanical interaction. When a mechanical interaction is no longer indicated, the detection processor returns the multiplex switch back into the initial state.

Alternatively, if one or more key presses are detected relating to either the seven leftmost conductive tracks 3211, 3301 to 3306, then the detection processor 3401 performs a binary search to identify the conducting row and column intersection at which a mechanical interaction is present. The circuit does this by a process of elimination. For example, if a key press is not detected in the columns relating to conductive tracks 3307 to 3313 then no further search is necessary in respect of these columns. But, if a key press is detected in the seven leftmost conducting columns relating to conductive tracks 3211 and 3301 to 3306, the multiplex switch 3404 under the control of detection processor 3401 makes connections from pressure/location detection circuit 3402 to the first four conductive tracks 3211 and 3301 to 3303 of layer 3202 and a further connection to the five conductive tracks on layer 3203. Pressure/location detection circuit 3402 detects the presence of an open or closed circuit and provides an indicative output to detection processor 3401. The multiplex switch 3404, then makes a connection from pressure/location detection circuit 3402 to the next three attachment portions 3304 to 3306 while maintaining the connections to the five conductive tracks of layer 3203. The pressure/location detection circuit 3402 detects the presence of an open or closed circuit and provides an indicative output to detection processor 3401.

Thus, the control circuit identifies if just one or both of the two groups of four columns is subject to a key press. If just one of the two groups is identified as relating to a key press, then this group only is interrogated and the other group is eliminated from further search. But if both groups are identified as relating to a key press, then both groups will need to be interrogated further.

The process of binary search is continued in this manner until the identity of the individual columns relating to the key press or presses is established. A similar process is then followed to establish which of the rows contains the key press or presses. This is done by making connection of the location detection device to all fourteen conductive tracks of layer 3202 and a second connection to a varying number of the conductive tracks of layer 3203. Having established both the row and the column, the detection processor 3401 then provides an output indicating the location(s) to output socket 3407 via the switching circuit 3403. The detection processor then resets the multiplex switching circuit to its initial state in readiness for the next mechanical interaction to be detected.

The membrane keyboard embodiment described in reference to FIGS. 32 to 33 may be substituted for the fabric keyboard as described in all the previously described embodiments. Accordingly, the membrane keyboard may be folded in any of the previously described configurations.

What is claimed is:

1. A manually operable input apparatus for a portable electronic processing device, defining a plurality of regions each representing a respective data item, said manually operable input apparatus comprising a plurality of sheets configured to produce a response to a mechanical interaction and a stand for supporting said electronic processing device; wherein
said sheets are configured to be wrapped around said electronic processing device to provide a protective cover, and
said sheets are configured to be foldable through at least one of said plurality of regions;
said input apparatus comprises connecting means to connect said input apparatus to said electronic processing device, and
said connecting means is foldable to allow said input apparatus and said electronic processing device to be mutually arranged in an operational configuration in which said electronic processing device is supported in a position spaced apart from said input apparatus, and to be reconfigured into a wrapped configuration in which said electronic processing device is enveloped by said input apparatus, by the steps of
folding said connecting means about a first axis to an intermediate position in which said electronic processing device is received on a surface of said input apparatus, and
bending said input apparatus about a second axis non-parallel with said first axis and a third axis non-parallel with said first axis.

2. Apparatus according to claim 1, wherein said input apparatus is a keyboard.

3. Apparatus according to claim 2, wherein said input apparatus is constructed from fabric.

4. Apparatus according to claim 2, wherein said input apparatus comprises a membrane keyboard.

5. Apparatus according to claim 2, wherein said keyboard surface is configured so as to facilitate the bending of the keyboard.

6. Apparatus according to claim 1, wherein said processing device is a hand-held computer, a mobile telephone or portable audio equipment.

7. Apparatus according to claim 1, wherein said connecting means further comprises an interface circuit configured to apply voltages to one or more of said sheets and to convey positional data to said electronic processing device.

8. Apparatus according to claim 7 wherein said electronic processing device is programmed to correlate said positional data with look up tables for converting positional data received from said interface circuit into a presentation in form of alpha numeric text.

9. Apparatus according to claim 1, wherein said connecting means is configured so as to retain said electronic processing device connected thereto during bending operations.

10. Apparatus according to claim 1, wherein said connecting means is configured so as to retain said electronic processing device connected thereto during folding operations.

11. Apparatus according to claim 1, wherein said second axis and third axis are disposed in a substantially parallel relationship to one another.

12. Apparatus according to claim 1 wherein said second bending axis and said third bending axis divide the input apparatus into a central portion, a first lateral substantially planar portion and a second lateral substantially planar portion.

13. Apparatus according to claim 12 wherein, in the intermediate position said electronic processing device is received by said central portion and said first lateral portion bends about a first edge of said electronic processing device along said second axis and said second portion extends about a second edge of said electronic processing device along said third axis to form said wrapped configuration.

14. Apparatus according to claim 13, wherein said first lateral portion and said second lateral portion of said input apparatus are secure in the wrapped configuration by a securing means.

15. Apparatus according to claim 14, wherein said securing means is a hook and loop fastening system such as VELCRO®.

16. Apparatus according to claim 1, wherein in said intermediate position, said electronic processing device is operable independently of said input apparatus.

17. Apparatus according to claim 1, wherein said electronic processing device is supported by said stand in said operational configuration.

18. Apparatus according to claim 17, wherein said stand comprises a flexible fabric cable having electrical connection elements contained therein.

19. Apparatus according to claim 18, wherein said stand comprises hinged support portions to facilitate the erection of said stand.

20. Apparatus according to claim 19, wherein said sections of plastic hinge about said flexible fabric cable.

21. Apparatus according to claim 1 and a portable electronic processing device in combination wherein said input apparatus is permanently attached to an edge of said electronic processing device and is configured to allow mutually arrangement in an operable configuration, in which the input apparatus extends from said edge of said electronic processing device, and reconfiguration into the wrapped configuration in which said input apparatus is wrapped around said electronic processing device.

* * * * *